United States Patent
Hughes

(10) Patent No.: US 6,275,223 B1
(45) Date of Patent: *Aug. 14, 2001

(54) INTERACTIVE ON LINE CODE INSPECTION PROCESS AND TOOL

(75) Inventor: Gerard John Hughes, Maidenhead (GB)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,682

(22) Filed: Jul. 8, 1998

(51) Int. Cl.[7] .................................................. G06F 3/00
(52) U.S. Cl. ............................. 345/331; 345/971; 717/1
(58) Field of Search .................................. 345/326, 329, 345/330, 331, 332, 333, 334, 339, 340, 341, 348, 349, 971; 395/701, 702, 703, 704, 712; 707/512; 717/1, 2, 3, 4, 11

(56) References Cited

U.S. PATENT DOCUMENTS

| | | | |
|---|---|---|---|
| 4,899,299 | 2/1990 | MacPhail | 707/204 |
| 4,974,173 | 11/1990 | Stefik et al. | 345/331 |
| 5,008,853 | 4/1991 | Bly et al. | 345/331 |
| 5,410,648 * | 4/1995 | Pazel | 717/4 |
| 5,428,729 | 6/1995 | Chang et al. | 345/331 |
| 5,442,740 * | 8/1995 | Parikh | 345/440 |
| 5,581,797 * | 12/1996 | Baker et al. | 345/326 |
| 5,644,692 * | 7/1997 | Eick | 345/326 |
| 5,710,899 * | 1/1998 | Eick | 345/339 |
| 5,742,777 * | 4/1998 | Eick | 345/326 |
| 5,793,369 * | 8/1998 | Atkins et al. | 345/339 |
| 5,847,972 * | 12/1998 | Eick et al. | 345/440 X |
| 5,877,760 * | 3/1999 | Onda et al. | 345/341 |
| 5,945,998 * | 8/1999 | Eick | 345/431 |

* cited by examiner

Primary Examiner—Crescelle N. dela Torre
(74) Attorney, Agent, or Firm—Lee, Mann, Smith, McWilliams, Sweeney & Ohlson

(57) ABSTRACT

A code inspection tool comprises a plurality of physical computing resources connected by a network facility, eg an LAN, intranet or internet, and a voice conferencing communications facility. The code inspection tool interfaces with a known configuration management system to load a quantity of original source code. A group of developers use a plurality of graphical user interfaces to inspect the code. All graphical user interfaces log into display views generated on a main graphical user interface, which is operated by a human controller of a code inspection session. The code inspection tool comprises means for allowing developers to compile annotation data and forward the annotation data from their respective graphical user interfaces to a centralized data store. Internal algorithms of the code inspection tool compile markers relating the annotation data files to individual lines of source code. During a code inspection session, all developers view a same display, which sets out original source code, side by side with new source code on a line by line basis, matching the line numbers of the original source code with those of the new source code. Changes to the original source code and new source code are visually identified by automatic generation of icons next to the appropriate source code lines on the display. Annotations to the source code lines are indicated by further icons next to the appropriate lines. The tool automatically generates data describing statistics of a code inspection process, for example number of lines inspected, during of a code inspection session, proportion of original and new code lines inspected. Code inspection reports may be generated in a variety of formats, eg plain text or HTML, and automatically distributed to individual developers over the networked facility.

23 Claims, 20 Drawing Sheets

```
.application Cluzo
.version <version of file>
.date <date>
.duration <hours> <minutes>
.moderator <name>
.author <name>
.inspector <name>
    .
    .
    .
.inspector <name>
.changeid <change ID>
    .
    .
    .
.changeid <change ID>
.conclusion <conclusion>
.filename <inspected file>
.statistics <old lines> <changes lines> <new lines> <total>
.lines <annotation type>
.abbrev <annotation type abbreviation>
.description <paragraph>

.description <paragraph>
    .
    .
    .
.lines <line No.> - <line No.>
.type <annotation type>
.abbrev <annotation type abbreviation>
.description <paragraph>
    .
    .
    .
.description <paragraph>
    .
    .
    .
.filename <inspected file>
    .
    .
    .
.description <paragraph>
```

Fig. 22

Inspection Date: 1996/10/30
Inspection Duration: 1 Hours 2 Mins
Moderator: Patricia Morrison
Author: Robert Smith
Inspectors: Melissa Hart
Pierre Poirot
Taiwo Sorunbe Change ID:

Conclusion: Conditional

Number of Modules: 1
Lines Inspected: 7
Old Code: 42.85%
New Code: 57.14%

Annotation Summary

Code Comment         4
------------------   ---
Total                4

Source Files

New
-----

Line Number: 2
Type: Code Comment
Description: Incorrect file name in header lines.

Fig. 23A

Line Number: 14
Type: Code Comment
Description: Why use this particular strong?

Line Numbers: 33-42
Type: Code Comment
Description: Again the variables are meaningless.

Line Numbers: 47-54
Type: Code Comment
Description: Could we change all variables to more meaningful vocabulary???

| Old Lines | 3 |
| New Lines | 4 |
| --- | --- |
| Total | 7 |

Fig. 23B

Code Inspection Report

Inspection Date: 1996/10/30
Inspection Duration: 1 Hour 2 Minutes

Moderator: Patricia Morrison
Author: Robert Smith
Inspectors: Melissa Hart
Pierre Psirot
Taiwo Sorungbe Change ID:

Conclusion: Conditional

Source File Summary

Source Files Inspected: 1

| Source File | Source Lines | | |
|---|---|---|---|
| | Old | New | Total |
| New | 3 | 4 | 7 |
| Total | 3 | 4 | 7 |
| Percentage | 42.85% | 57.14% | 100.00% |

Annotation Summary

| | |
|---|---|
| Code comment | 4 |
| Total | 4 | new

| Line Numbers | Description | Type |
|---|---|---|
| 2 | Incorrect file name in header lines. | CC |
| 14 | Why use this particular string? | CC |
| 33-42 | Again the variables are meaningless. | CC |
| 47-54 | Could we change all variables to more meaningful variables? | CC |

Fig. 24

INTERACTIVE ON LINE CODE INSPECTION PROCESS AND TOOL

FIELD OF THE INVENTION

The present invention relates to a method and apparatus for inspection of computer code.

BACKGROUND TO THE INVENTION

Conventional modem communication systems rely heavily on physical resources which are controlled by data processing devices, eg, switch fabrics, routers, frequency channel assignment apparatus, networked personal computers, network management systems and the like. Data processing devices typically operate in accordance with the known Von Neumann methods, in which a large number of logic elements eg, bi-stable devices, transistors or the like sequentially switch between states under control of (typically) electronic signals. Large collections of such signals comprise a know computer program. At a higher level, the individual signals which control individual logic devices are assembled from a set of instructions written in a known computer language. Such instructions are generically referred to as code. A conventional computer program may contain hundreds of thousands, to tens of millions of lines of code. For example, a main control program for the known DMS100 broad band switch manufactured by Northem Telecom Limited contains of the order of ten million individual lines of code and is written in a proprietary programming language. Programs of more modest length may typically have between one hundred thousand, and three million lines of code. In general, as computing resources become more powerful, and program developers take advantage of increased computing power to provide more and more features, there is a generalised tendency within both the Telecom's and computer industries for programs to become more and more complex, to contain greater numbers of lines of code.

In U.S. Pat. No. 5,428,729 (IBM) there is disclosed a data processing system having a plurality of workstations for generation of a software application package by a plurality of programmers under control or a metaprogrammer. An object of U.S. Pat No. 5,428,729 is to automate management of a design through the implementation of a software application.

In any communications system, whether packet switched or circuit switched, reliability and robustness are of primary concern, and due to the high dependency of communication systems on program control, de-bugging and improving programs by way of regular code inspections is of primary importance, and is an essential part of the construction process of any program.

The code inspection process operated at Nortel (Northem Telecom Limited) involves calling a meeting between a team of program developers responsible for a program or a section of a program in order that the code can be inspected, and any potential problem areas in the code identified. An overall development process for a program involves many such code inspection meetings. After each code inspection meeting, the developers attempt to modify or re-write any code lines for which they have responsibility, and which have been identified as being problematic or capable of improvement at the code inspection meeting.

Referring to FIG. 1 herein, there is illustrated in general a code inspection process. In an overall development cycle of a program, many such code inspection processes will occur on various components of a program. Regular code inspections during a program build have the direct advantages of increasing software quality, identifying errors early on in a development cycle, decreasing testing time, reducing reworking and improving efficiency of error detection. Indirect advantages include increases in customer satisfaction through better more reliable products.

Typically, a code inspection meeting is organised according to the following format:

Code inspection meetings occur for selected sections of code or modules of code of a program, not for a complete program.

In step 100 a manager or program developer calls a code of inspection meeting, to be attended by a team of developers working on a particular portion of code, subject of the meeting.

In step 101, prior to the code inspection meeting each developer photocopies a print out of the particular code portions on which they are working and for which they have responsibility.

In step 102, typically, three or four developers will attend a code inspection meeting, and the code inspection meeting may last of the order of two hours.

At the code inspection meeting, individual lines of code are inspected by all or some developers on a line-by-line basis. Each developer makes notes of any proposed changes to the particular portions of code for which they have responsibility. Responsibility for the overall progress of the meeting and responsibility for recording changes of code is designated to one developer or manager, who is known as a "moderator".

In step 103, after the meeting the moderator, or one of the developers prepares typed or written minutes of the meeting identifying lines of code which are to be changed, and any proposed changes to that code. Then, one or more of the developers re-work the code The developer who is responsible for a particular portion of code makes the changes.

Changes to the actual working copy of the program are not made at the meeting—these are to be carried out later by the individual developers. A re-work follow up meeting is optionally carried our in step 104.

Although code inspection meetings are an essential part of building a program, there are several problems associated with such meetings. Firstly, good experienced program developers are scarce, and their time is valuable. Having three or four program developers spending time photocopying code, and having a program developer preparing minutes of a code inspection meeting is not an optimum use of their time. However, preparing material to bring along to a code inspection meeting is a skilled task, and therefore needs to be carried out by developers and is not easily delegated. Secondly, preparation of minutes of the meeting introduces a delay into product development, since programmers may not address problems identified at the code of inspection meeting until the typed up minutes of the meeting are available. Thirdly, developers may be situated at physically separate locations, for example either at different locations within a same building, within an area of a few hundred meters of each other at different sites a few miles or tens of miles apart, or in a multi-national organisation, developers may be located on different continents. In the latter case, it may only be practicable for a developer to 'attend' a meeting by telephone conference call. Fourthly, there is the problem that the rate at which lines of code can be inspected is relatively low. For example, in a two hour meeting attended by four developers, where good progress is made, of the order of eight hundred to one thousand individual lines of code may be inspected (a good rate of code of inspection of around two hundred and fifty lines per developer hour). Thus, for a moderate size program of for example one hundred thousand lines of code, inspecting every line of code once would incur of the order of four hundred developer hours of code inspection meetings if a good rate of code inspection were achieved. However, such a code inspection overhead is unrealistic, since the necessary resource of developer time is unavailable, and if available, would be better utilized on other tasks. Further, it may be that some lines of code require more than one code inspection. For a large program, eg, ten million lines of code, it is not practicable to inspect every line of code, and in practice for most programs only 10 to 20% of lines of code are inspected, and it is accepted that there will be bugs and errors within programs. Typically, 20% pf the most complex code is responsible for of the order of 80% of all errors in a program. Complexity analysis tools are available for identifying the most complex portions of code. One such example is the QAC tool which is a C static analyzer which serves as a tool to help coders to check that their code adheres to recognized good practices. The QAC tool is able to warn of possible errors or bad practices not picked up by a compiler, as well as producing metrics on code which provide an indication of module complexity and maintainability.

SUMMARY OF THE INVENTION

One object of the present invention is to provide an improved process and apparatus for code inspection. By providing such a process and apparatus, it is aimed to eliminate the need for developers to print out or photocopy hard copy of code, prior to code inspections and to reduce administration tasks from previous code inspections.

Another aim is to eliminate or reduce the need for developers to prepare detailed minutes of code corrections.

A further aim is to improve the speed and efficiency of the code inspection process itself with the object of increasing the number of lines of code which can be inspected in a code inspection session, and to automatically generate metrics data to provide a measure of the rate of code inspection, and a number of lines of code altered.

Another aim is to efficiently produce detailed records of proposed alterations to code.

A specific implementation of the invention includes a code inspection tool comprising a plurality of physical computing resources connected by a network facility, eg an LAN, intranet or internet, and a voice conferencing communications facility. Suitably, the code inspection tool interfaces with a known configuration management system to load a quantity of original source code. A group of developers may use a plurality of graphical user interfaces to inspect the code. All graphical user interfaces log into display views generated on a main graphical user interface, which is operated by a human controller of a code inspection session. The code inspection tool comprises means for allowing developers to compile annotation data and forward the annotation data from their respective graphical user interfaces to a centralized data store. Internal algorithms of the code inspection tool compile markers relating the annotation data files to individual lines of source code. During a code inspection session, all developers view a same display, which sets out original source code, side by side with new source code on a line by line basis, matching the line numbers of the original source code with those of the new source code. Changes to the original source code and new source code are visually identified by automatic generation of icons next to the appropriate source code lines on the display. Annotations to the source code lines are indicated by further icons next to the appropriate lines. The tool automatically generates data describing statistics of a code inspection process, for example number of lines inspected, duration of a code inspection session, and proportion of original and new code lines inspected. Code inspection reports may be generated in a variety of formats, eg plain text or HTML, and automatically distributed to individual developers over the networked facility.

By displaying original source code lines on a same visual display device as modified source code lines, high visibility of changes to the original source code may be achieved, with a benefit of contributing to an increased rate of code inspection, and improving efficiency of rewriting of code after a code inspection session.

According to a first aspect of the present invention there is provided a machine executable code inspection process comprising the steps of:

inputting pre-written code from an external source, and storing said code in a memory area;

displaying said code on a visual display device;

in response to inputs from a graphical user interface, modifying individual lines of said code; and for each modified line of code, displaying on said visual display device at least one respective icon identifying said line of code.

Preferably, said pre-written code is replicated and stored in a second memory area. The pre-written code and the replicated code can be displayed on a same screen of said visual display device.

Preferably, the process comprises the steps of counting a number of said modified code lines and producing data describing a number of said modified code lines.

Said process may comprise the steps of inputting a start session signal; activating a timer in response to said start session signal; stopping said timer in response to a stop session signal; and generating a session time signal corresponding to a time difference between said start session signal and said stop session signal.

The process may comprise the step of generating data describing a rate of inspection of said code, and generating a report output data describing a result of a code inspection.

According to a second aspect of the present invention there is provided a machine executable process for recording details of a code inspection session, said process comprising the steps of inputting code comprising a plurality of code lines;

displaying said plurality of code lines on a visual display device;

inputting modifications to said code to produce modified code;

displaying said modified code on said visual display device; and generating data describing said modified code.

Said step of generating data describing said modified code may comprise generating a metrics data describing at least one metric of said modified code.

Said process may further comprise the steps of:

inputting annotation data describing annotations to said code lines;

storing said annotation data to a memory device; and displaying said annotation data on said visual display device.

Data describing an amount of annotations of said modified code may be generated, and data describing an amount of code lines modified during said code inspection session may be generated.

According to a third aspect of the present invention there is provided a code inspection tool for facilitating inspection of code comprising a plurality of code lines, said tool being executable by a machine comprising at least one data processing means, at least one data storage means, and at least one graphical user interface having a visual display device, said tool comprising:

an interface means for interfacing with a code development tool for input and output of said code;

a display generation means for generating a plurality of displays of said code for display on said visual display device;

a monitoring means for monitoring a result of a code inspection process; and a report data generation means for generating a report data describing a code inspection session.

Said display generation means is preferably operable to generate a window display arranged for display of said code lines.

Preferably, said display comprises a window for containing a display of line numbering of code lines.

Preferably, said display comprises an icon representing an inserted code lines, icons indicating a line in an original source code file which has been changed, an icon indicating a line which was not in an original source code file, but which has been added to a replicated source code file, and an icon indicating a line which was in an original source code file, but which has been removed in a new source code file.

According to a fourth aspect of the present invention there is provided a code inspection process for inspecting a quantity of original source code by a plurality of users each provided with a corresponding respective graphical user interface, said inspection process comprising the steps of:

at a plurality of said graphical user interfaces, generating a display of original source code;

at individual ones of said graphical user interfaces, entering annotation data describing annotations to said source code, each said annotation identifying a line number of said source code;

sending said annotation data to a data storage device and storing said annotation data;

generating a source code display on each of said graphical user interfaces, said source code display comprising a first display area for display of original source code, and a second display area for display of replicated source code;

at each graphical user interface, scrolling said corresponding respective source code display such that all said source code displays are scrolled simultaneously and show a same common view;

interrupting said scrolling process for entry of annotation data relating to source code displayed during said scrolling process;

storing said annotation data entered during said interruptions; and terminating said scrolling process.

Preferably, said process further comprises for each line of code scrolled, incrementing a line counter recording data describing a quantity of said scrolled lines, and storing said scroll count data to a report file.

Preferably, said process further comprises the steps of for each said annotation data entered, incrementing a counter describing a count of said annotations; and storing said annotation count data to a report file.

The process may comprise the steps of: generating a report file containing data describing:

data identifying a plurality of human operators;

data describing a plurality of source code files;

data describing an amount of new code lines in each of said source code files;

data describing a proportion of original source code lines and new source code lines changed;

data describing a number of annotation comments.

The process may comprise the step of generating a report file containing:

data describing a type of annotation data; and an amount of annotations of each of said types.

The process may comprise the steps of identifying source code lines having errors which affect overall operation of said source code; and storing annotation data describing said operation affecting errors.

The invention includes a machine executable code inspection process comprising the steps of:

inputting pre-written code from an external source, and storing said code in a memory area;

displaying said code on a visual display device;

in response to inputs from a graphical user interface, entering data relating to individual lines of said code; and for each line of code for which data has been entered, displaying on said visual display device at least one respective icon identifying said line of code.

Annotations may also be input from the external source.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 22 illustrates a format for a report file, into which report data is stored;

FIGS. 23A and 23B illustrates herein a code inspection report data file in plain text format, being an output of the code inspection tool; and FIG. 24 illustrates the code inspection report data file in HTML format.

DETAILED DESCRIPTION OF THE BEST
MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
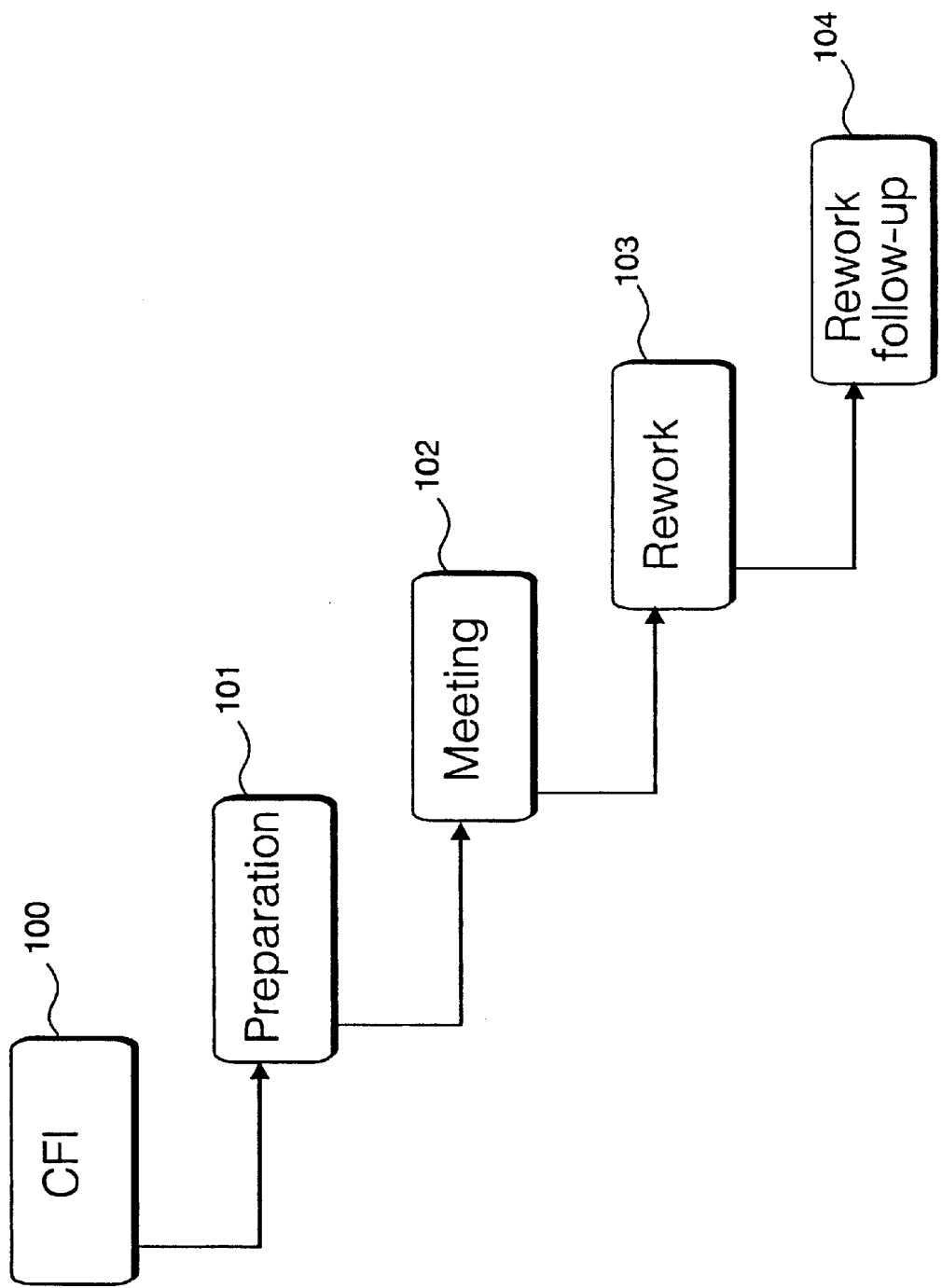
FIG. 1 illustrates in general a code inspection process.
Figure 2:
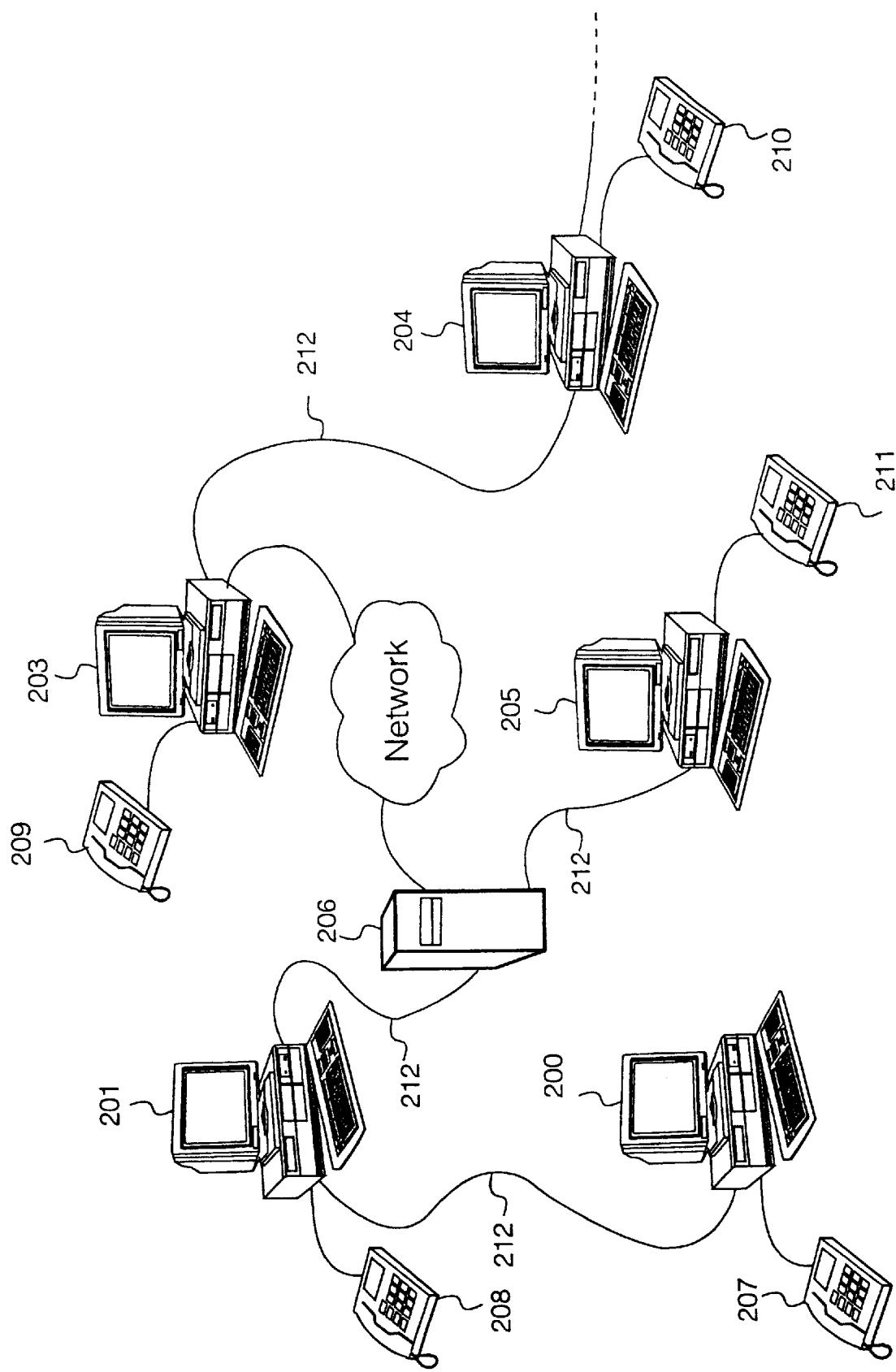
FIG. 2 illustrates in general physical view elements of a code inspection tool according to a first specific implementation of the present invention.

Referring to FIG. 2 herein, there is illustrated in general view, a code inspection tool according to a first specific implementation of the present invention. The code inspection tool comprises a plurality of computing and data processing physical resources (200–206), including a plurality of processors; a plurality of memory areas; and a plurality of graphical user interfaces, each graphical user interface comprising a visual display device, a keyboard for manual data entry, and a pointing device, eg a mouse or trackball device; and a voice communications capability, for example a set of internet telephones (207–211) communicating through the computing/data processing resources, or alternatively a conventional telephone network having a conference call facility. The physical resources may be geographically close to each other, for example in a same room or in nearby rooms, or may be distributed, for example on different sites a few tens or hundreds of miles apart, or on different continents. A computer/data processing facility typically comprises a UNIX based platform, eg a HP9000 work station or similar. In other embodiments, conventional PCs may be used eg containing Intel Pentium processors. The workstations are linked by a network 212 so that each workstation can communicate with each other work station. The network may comprise a local area network, eg Ethernet, or a TCP/IP intranet or internet.

The computers may be linked by a known teleconferencing facility, for example Microsoft Net Meeting® wherein each workstation is provided with a microphone, and the computers are networked for communicating with each other by voice.

Prior art systems whereby electronic documents and data are shared between a plurality of graphical user interfaces are known in U.S. Pat. No. 4,899,299 and U.S. Pat. No. 5,008,853 and in the present best mode, sharing of common views of a screen over a plurality of graphical user interfaces may be implemented by the person skilled in the art using known methods.

Figure 3:
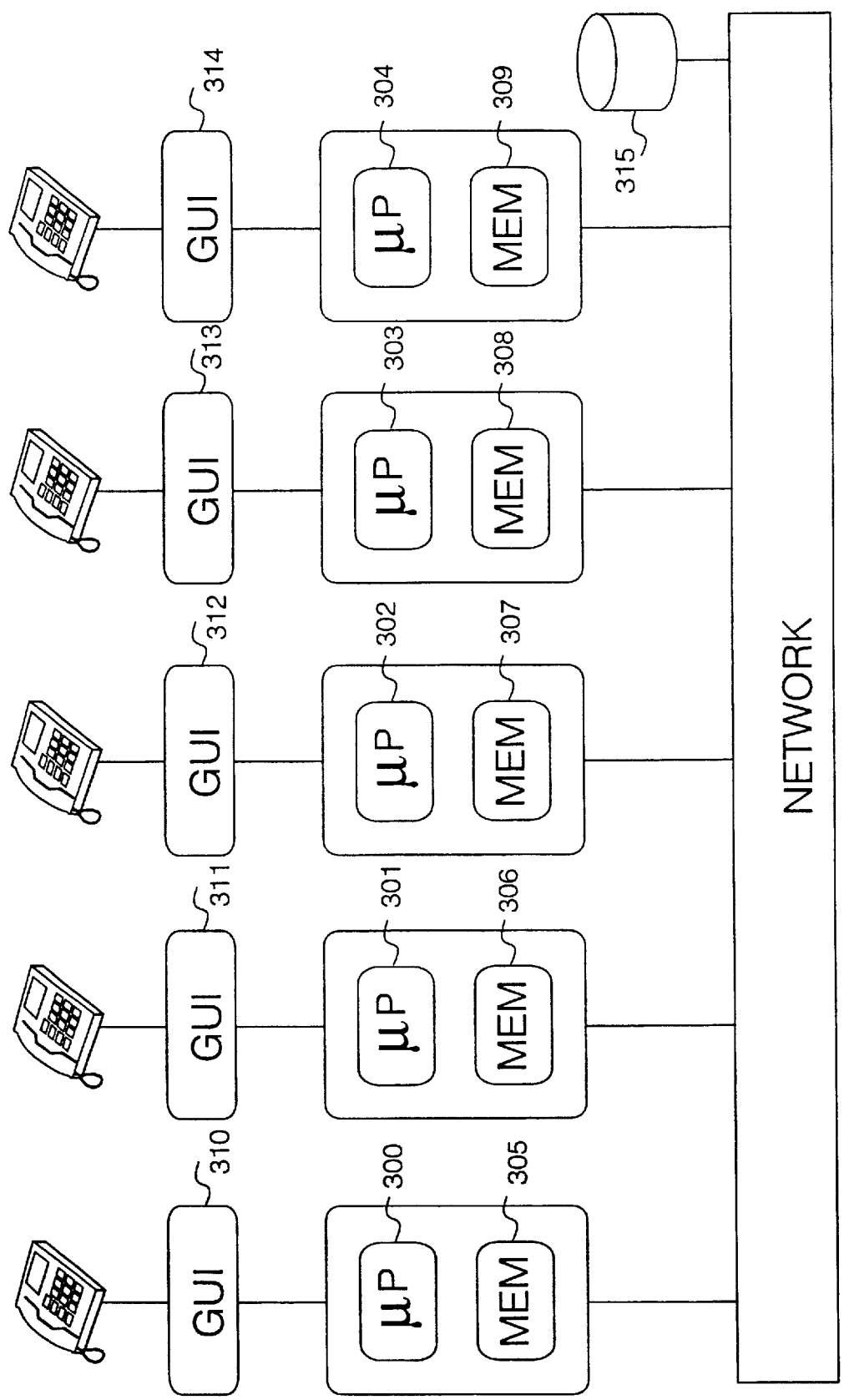
FIG. 3 illustrates schematically physical resources comprising the code inspection tool.

Referring to FIG. 3 herein, there is illustrated schematically main elements of the physical resources comprising the code inspection tool platform of FIG. 2. Each of the plurality of processors 300–304 and associated memories 305–309 are inter-connected by the network. Each graphical user interface 310–314 has, at the same location, a voice communication means, for example an internet phone or conventional telephone. The physical resources may comprise a data storage device 315 for storage of program code.

Figure 4:
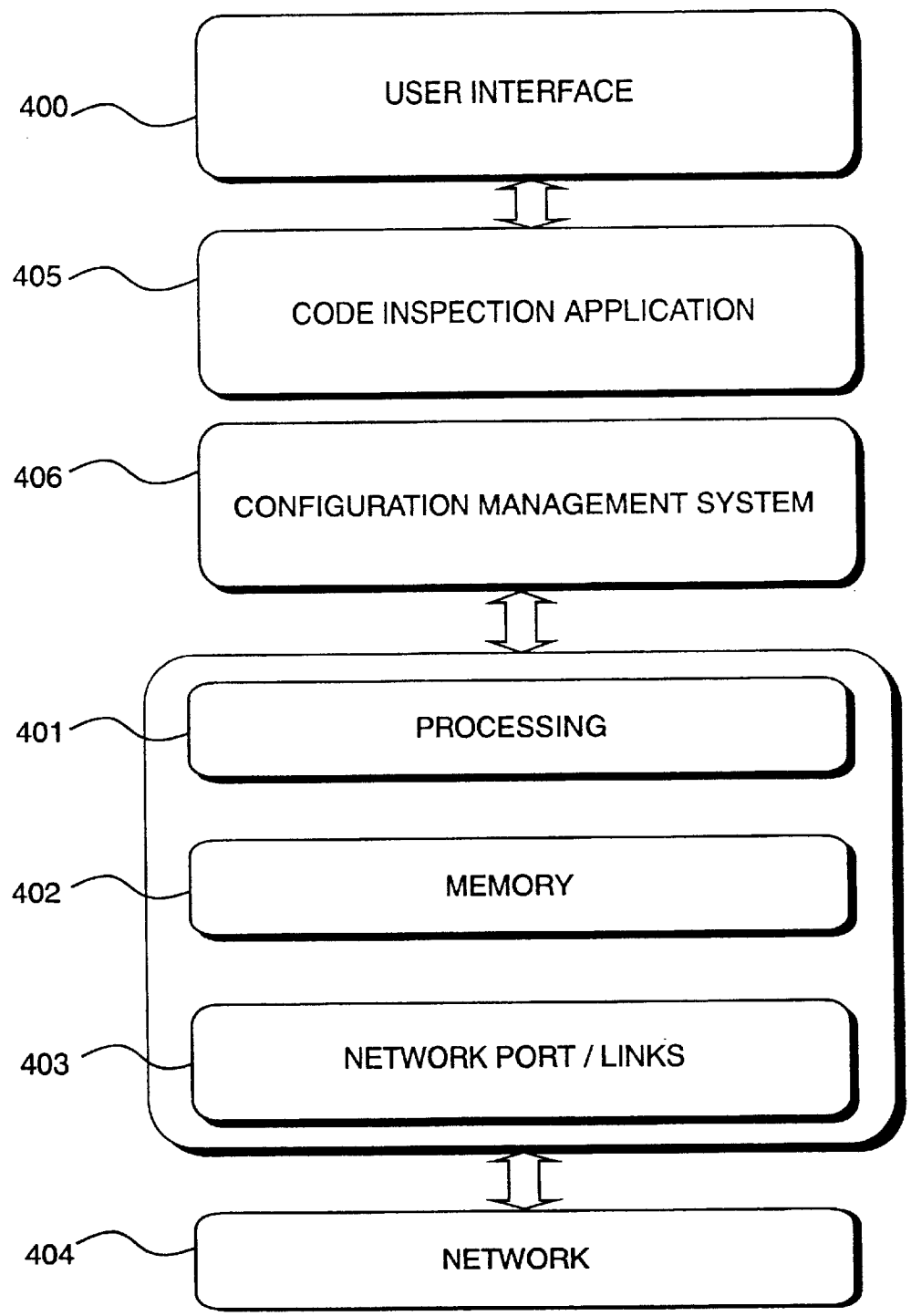
FIG. 4 illustrates schematically a logical view of the physical resources described with reference to FIGS. 2 and 3 herein.

Referring to FIG. 4 herein, there is illustrated schematically a logical view of the physical resources described with reference to FIGS. 2 and 3 herein. The plurality of voice communications means and plurality of graphical user interfaces are represented logically as a single user interface 400 through which a plurality of individual developers may communicate with each other. The combined data processing resources of all work stations is represented logically as a single processing capability 401, and similarly for the combined memory resource of all work stations represented logically as a single memory resource 402, and the networking facility comprising a LAN, intranet or internet or a combination of these is represented by a single network port facility 403 and network connection 404.

In the best mode herein, the code inspection tool comprises the combination of the networked physical resources, operated under control of a code inspection application 405. The code inspection application 405 is duplicated and is physically located on each work station as a separate application loaded into the memory resource of that workstation. The code inspection application 405 communicates with a conventional configuration management system 406 also resident on the physical resources. The configuration management system may comprise one of a number of commercially known configuration management systems, for example "Clear Case" available from Rational Software Corporation. However, other known commercially available or proprietary configuration management systems may be used. A known configuration management system, as will be well known to those skilled in the art, comprises a tool for development of source code. Within the known configuration management system, there is stored a working copy of source code, this being a main "build" of code. Also within the conventional configuration management system, individual portions of code are stored, which may be being developed, prior to authorization for insertion into the main build of code.

Figure 5:
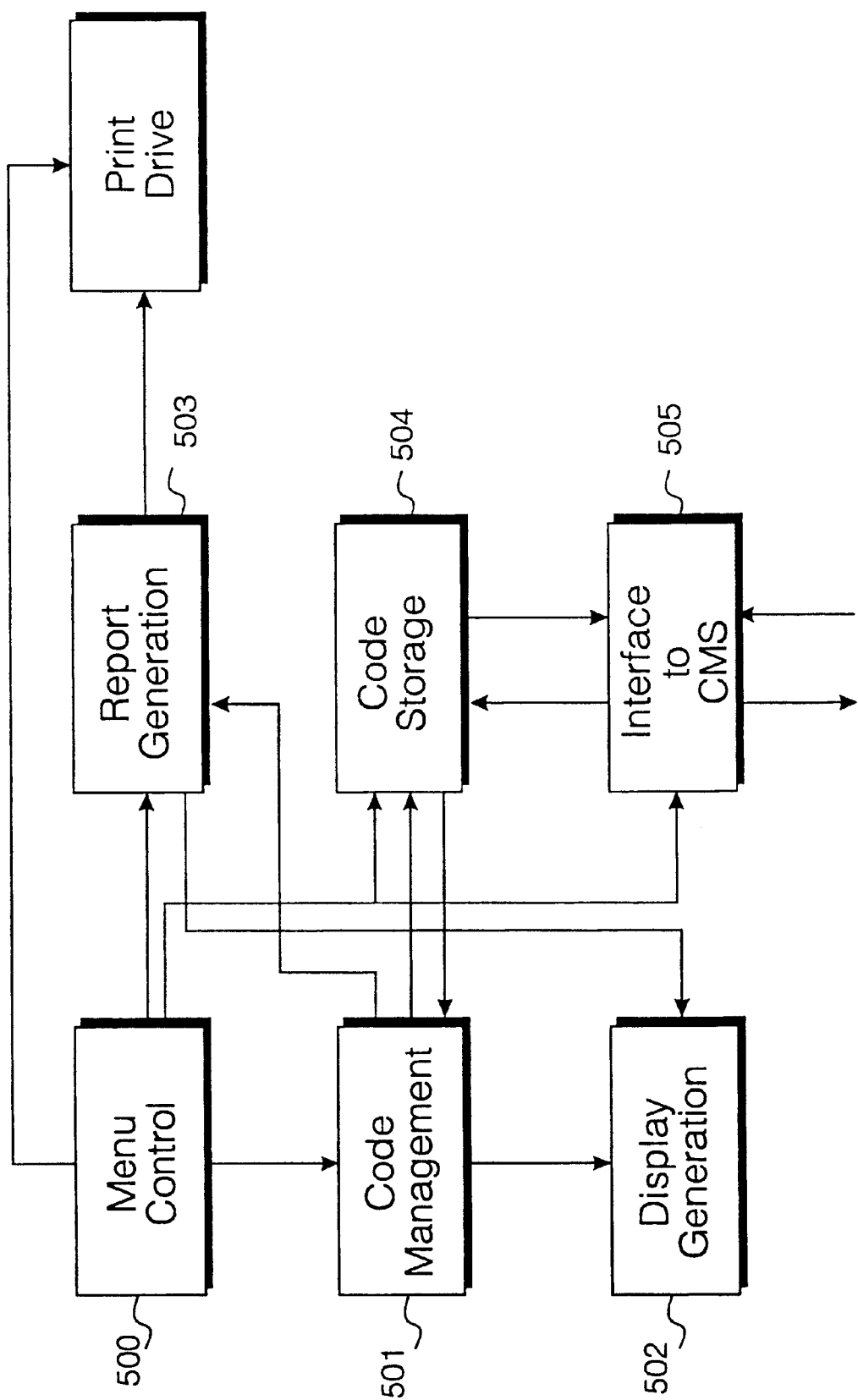
FIG. 5 illustrates schematically components of a code inspection application comprising the code inspection tool.

Referring to FIG. 5 herein, there is shown schematically an architecture of the code inspection application 405. The code inspection application comprises components for menu control 500, code management 501, display generation 502, report generation 503, code storage 504 and interfacing to a configuration management system 505, in the best mode herein, each of the components are implemented in terms of control signals which control the physical electronic data processors and hardware memory devices as described hereinbefore, for example by instructions as written in a known computer language eg C, and running on the UNIX based workstations or PCs.

Operation of the code inspection tool, and the elements of FIG. 5 will now be described in terms of data processing operations which are performed by the code inspection tool, and data inputs and outputs to and from the code inspection tool. The data processing operations and data inputs and outputs occur in response to user commands of a group of developers in the context of a code inspection session.

Figure 6:
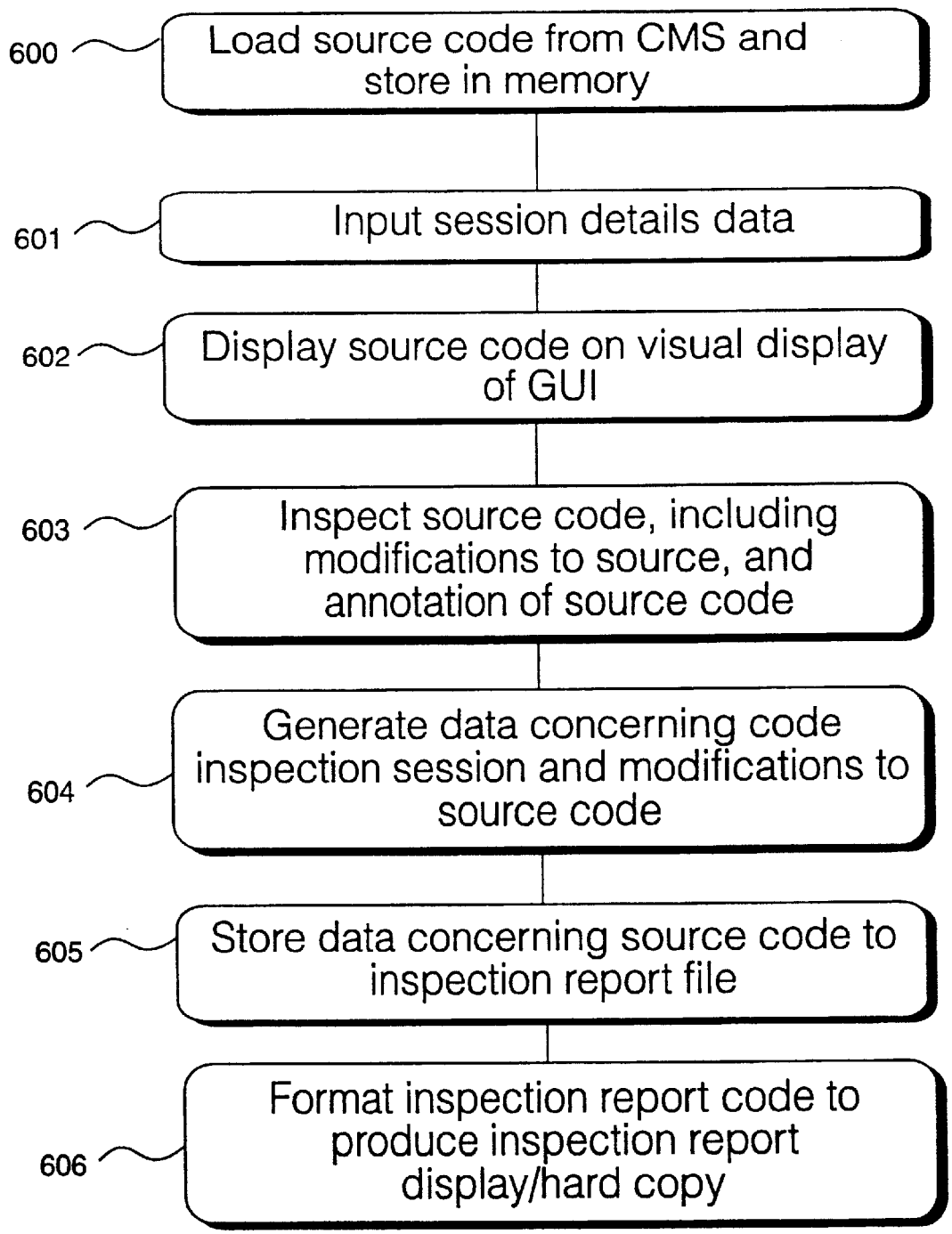
FIG. 6 illustrates schematically data processing steps carried out by the code inspection tool, according to a first specific process of the present invention.

Referring to FIG. 6 herein, in step 600 a moderator (one of the program developers nominally in charge of the code inspection process) by manipulation of a graphical user interface on one of the work stations loads source code to be inspected from the configuration management system 406 into code storage component 504. The original source code is accessed by code inspection application 405 via interface component 505 connected to the configuration management system. Loading of the source code into the code storage component 504 is activated by operation of a pointing device on a menu screen display generated by the code inspection application 405 on the user interface 400. In step 601, the moderator, by manipulating the pointer device to a drop down menu on a visual display, inputs data describing details of the code inspection session. Such data may include the date of the session inspection, and an identification of the source code being inspected. In step 602, code management component 501, in response to menu driven user inputs from the moderator retrieves original source code from code storage component 504 and displays the source code in a source code window on the visual display device of each of a plurality of graphical user interfaces networked together. In step 603, the moderator, by input of keyboard activated and pointing device activated signals to the code inspection application 405, controls scanning of the original code within the code inspection window display. Each of the plurality of graphical user interfaces simultaneously display the source code window, and operations made in response to signal inputs of the graphical user interface of the moderator are replicated on each of the graphical user interfaces of the other programmers or developers. Individual developers may take local control of their graphical user interface displays, so that they can look ahead at source code, or look back at source code previously inspected.

During code inspection 603 modifications to the source code can be entered, and annotations to the code can be made. In step 604, report generation component 503 generates data describing metrics of the code inspection process, eg a duration of the code inspection session, and a number of lines inspected during the code inspection session, and a number of lines modified.

In step 605, the report data is stored to a report data file. In step 606, the report data file is formatted to produce a display of data describing the code inspection session. The display may be in the form of an HTML presentation available for inspection on each of the graphical user interfaces, or in the form of a standard text file, eg an ASCII text file. In each case, the report may be printed our in hard copy via printer component 506. All operations of the code inspection tool are implemented by means of menu driven displays, generated by display generation component 500. Inputs to the menu displays are controlled by menu control 500 which also comprises conventional interfaces for receiving signals from conventional keyboard devices and pointing devices, eg a mouse or trackball device.

Various processes and operations implemented by the code inspection tool will now be described with reference to the graphical user interface and control of such processes and operations through a menu display activated by a keyboard and/or pointing device.

Generation and creation of the menu displays illustrated herein can be carried out by use of known display packages, eg by creation in conventional HTML packages, as will be well known to those skilled in the art.

Figure 7:
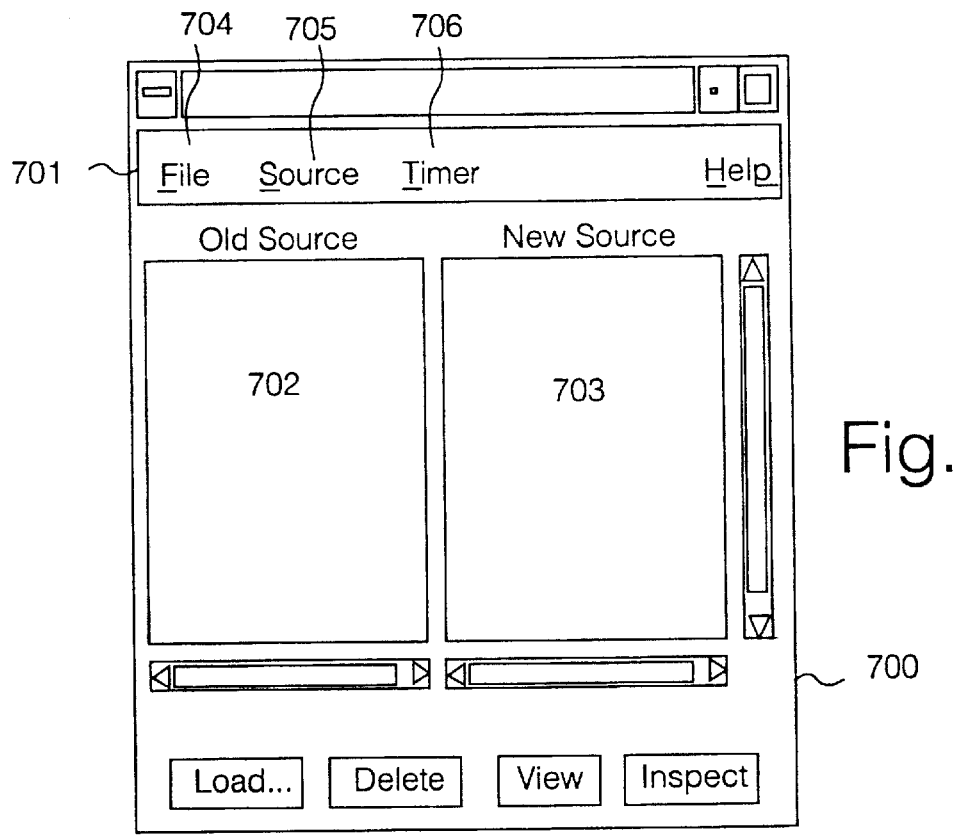
FIG. 7 illustrates schematically a visual display window by means of which specific processes according to the present invention may be implemented.

Referring to FIG. 7 herein, initiation of a code inspection session is instigated from a main window display 700. The main window display comprises a menu tool bar 701 having a set of drop down menus through which various processes and operations as will be described hereinafter can be initiated; a first display window 702 for display of original source code; and a second display window 703 for display of new source code. The main window display menu tool bar 701 comprises a file menu icon 704, a source menu icon 705 and a timer menu icon 706, each of which "drop down" in display view upon their activation to produce a respective menu list.

Options presented by the file menu 704, and processes activated therefrom will now be described.

Figure 8:
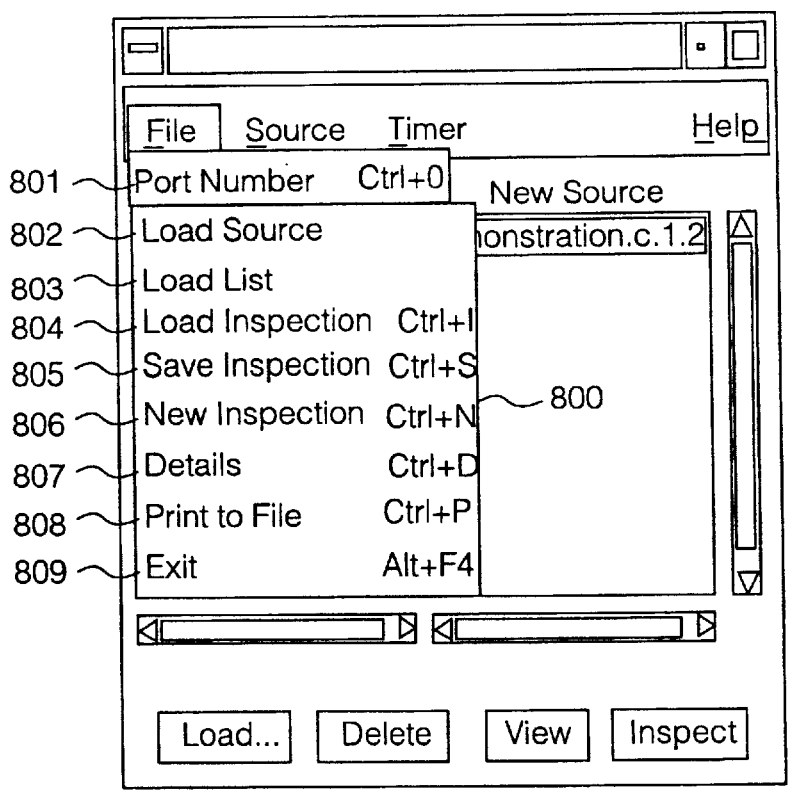
FIG. 8 illustrates a first operation of the visual display of FIG. 7.

Referring to FIG. 8 herein, there is shown file drop down menu display 800 produced by activation of the "file" menu icon 704 by manipulation of the pointing device. The file menu 800 comprises a plurality of item icons 801–809 which are activatable to provide various options for data processing, or to access other menus. Networking of a plurality of work stations to be included in a code inspection session can be set up by selection of items from the file menu. The items options shown in the file menu of FIG. 8 are presented on only one workstation, designated as the moderator's workstation. From this workstation, networking to other workstations in the code inspection session is implemented. The moderator's workstation drop down file menu display comprises a port number item 801 for specifying port numbers of other workstations to be connected within the session; a load source item 802 which, on activation, presents a load source dialog box display as described herein with reference to FIG. 12, for activating a process as described with reference to FIG. 11 hereinafter, a load list item 803 generates a dialog box display which allows the moderator to select a file containing a list of source files to be loaded into the code inspection application; a load inspection item 804 which is activatable to input inspection details, by generating a file selection dialog box which allows the moderator to specify a path for a file containing data describing a previously saved code inspection session; a save inspection item 805, activation of which generates a save inspection file selection dialog box display which allows the moderator to specify a path for a file to save a current code inspection; a new inspection item 806 which removes any existing code inspection information, leaving the code inspection tool ready to commence a new code inspection session; a details item 807 activation of which generates an inspection details dialogue box menu, the operation and functionality of which is described with reference to FIGS. 13 and 14 hereinafter; a pnnt to file item 808 which generates a file selection dialog box display which allows the moderator to specify a path for a file for printing the details of a code inspection session, as well as annotations; and an exit item 809 which returns the moderator to the main window display. Whilst the moderator is presented with all of the items as shown in FIG. 8 herein, workstations of other inspectors present only the details item 807 and exit item 809.

Figure 9:
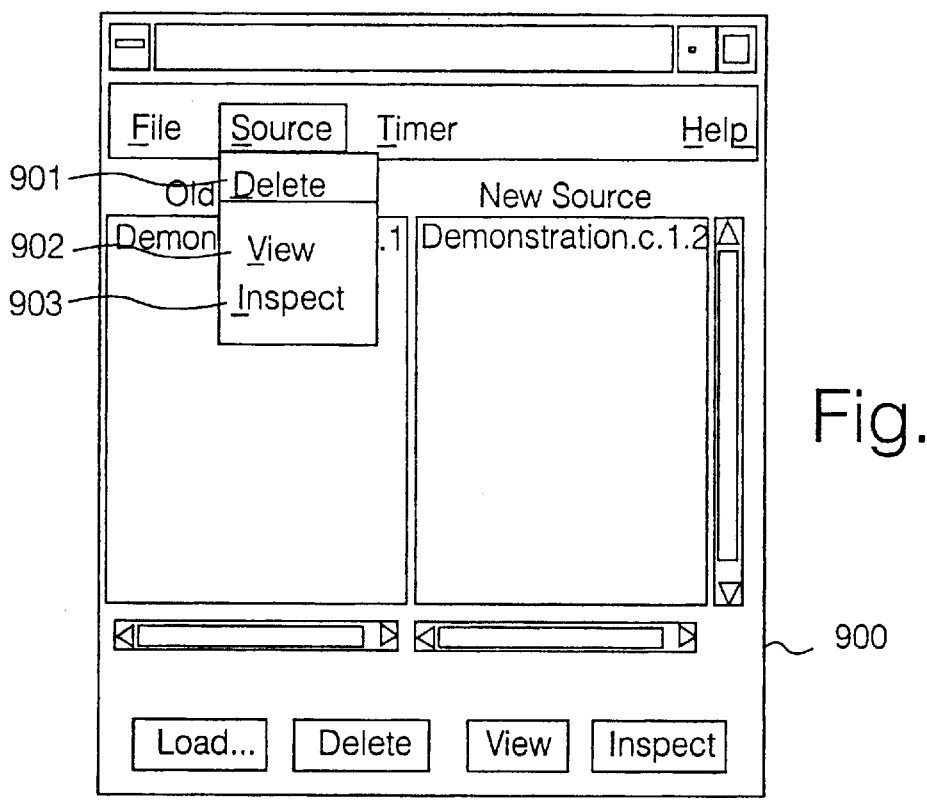
FIG. 9 illustrates a second operation of the visual display of FIG. 7.

Referring to FIG. 9 herein, activation of source menu icon 705 in the menu toolbar creates a drop down menu display 900 having items for delete 901, view 902, and inspect 903. The delete item is only available to the moderator. Activation of the delete item deletes an entry currently selected in a source file list from a code inspection session. Activation of the view option 902 opens up a view source window display as described hereinafter with reference to FIG. 14. Activation of the inspect option 903 results in generation of an inspect source window display for inspecting code, as described with reference to FIG. 15 herein.

Figure 10:
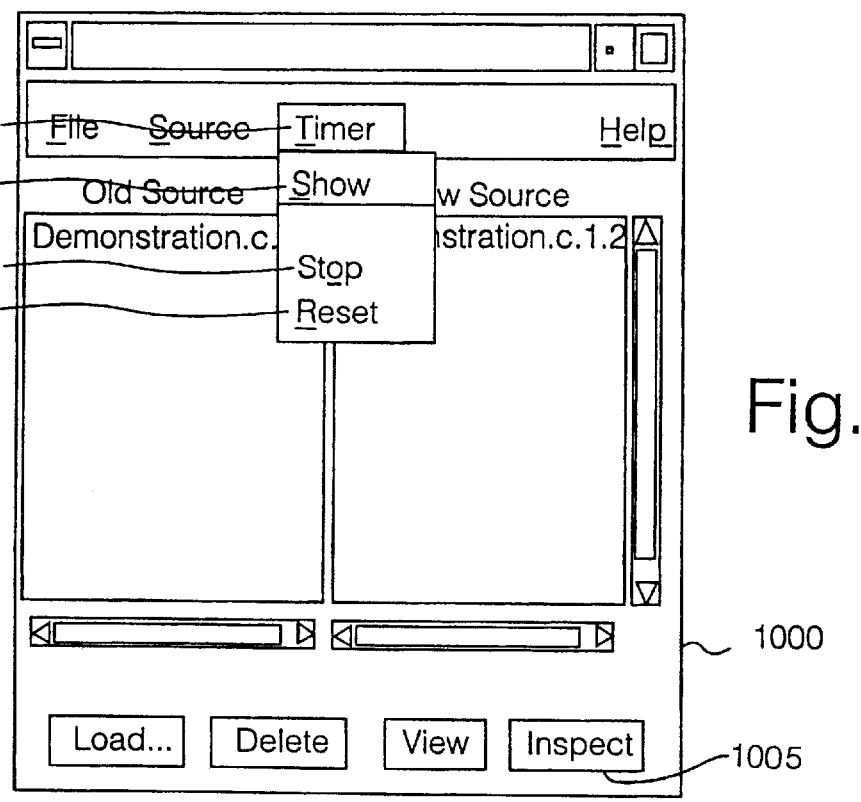
FIG. 10 illustrates a third operation of the visual display of FIG. 7.

Referring to FIG. 10 herein, activation of timer menu icon 706 in the menu tool bar generates a show item option 1000, a stop item option 1001 and a reset item option 1002. Activating the show item 1002 generates a timer menu window as illustrated with reference to FIG. 16 herein. The timer menu can be activated by operation of inspect icon 1005 which activates an internal clock for timing a code inspection session. At the end of a code inspection session, the clock is automatically terminated.

Data processing operations for loading of original source code and of specifying a path and filename of new source code will now be described.

Figure 11:
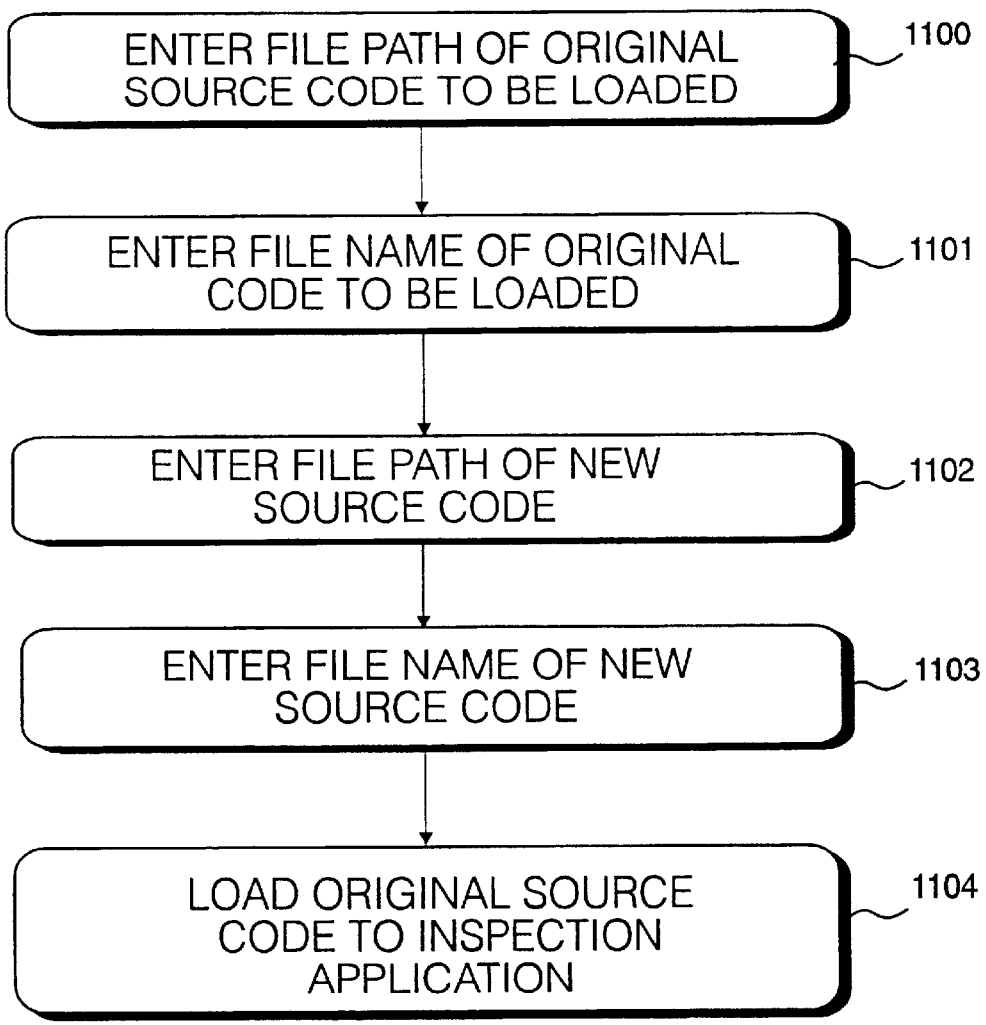
FIG. 11 illustrates schematically data processing operations for manipulation of original and new source code files according to a second specific process according to the present invention.
Figure 12:
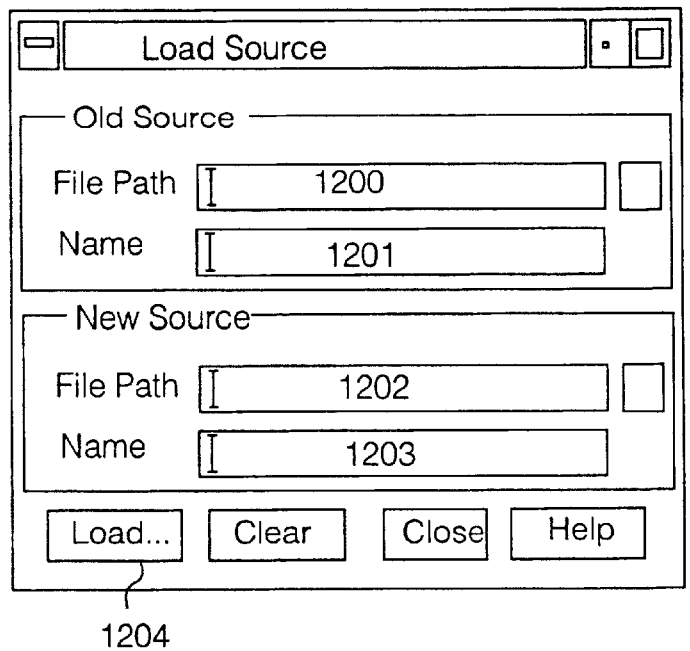
FIG. 12 illustrates schematically a visual display window comprising data entry means for implementing individual steps of the process described with reference to FIG. 11 herein.

Referring to FIG. 11 herein, in step 1100 the moderator enters data describing a file path name of a portion of original source code which is to be loaded into the code inspection tool. In step 1101 the moderator enters the file name of the original source code to be loaded. In step 1102, the moderator enters a file path of a new source code which is to be created, the new source code being a modified version of the old source code produced as a result of the inspection process. In step 1103, the moderator enters a file name for the new source code and in step 1104 the code inspection tool loads the original source code from the configuration management system into code storage component 504 via interface 505.

The data processing shown in FIG. 11 is carried out by the data processors under control of the code inspection application. Commands are entered through a dialog display under control of menu control component 500 and display generation component 502. An example of a menu display for loading original source code and activating the processes as described with reference to FIG. 11 is illustrated schematically in FIG. 12 herein. The file path and file name of the original source code in the configuration management system is entered in data entry windows 1200, 1201 and the file path and file name of the new source code, ie the place where the new source code is to be stored in the configuration management system is entered in data entry windows 1202, 1203. Loading of the original source code from the configuration management system is activated by applying a cursor and activating pointing device over a "load" icon 1204.

Figure 13:
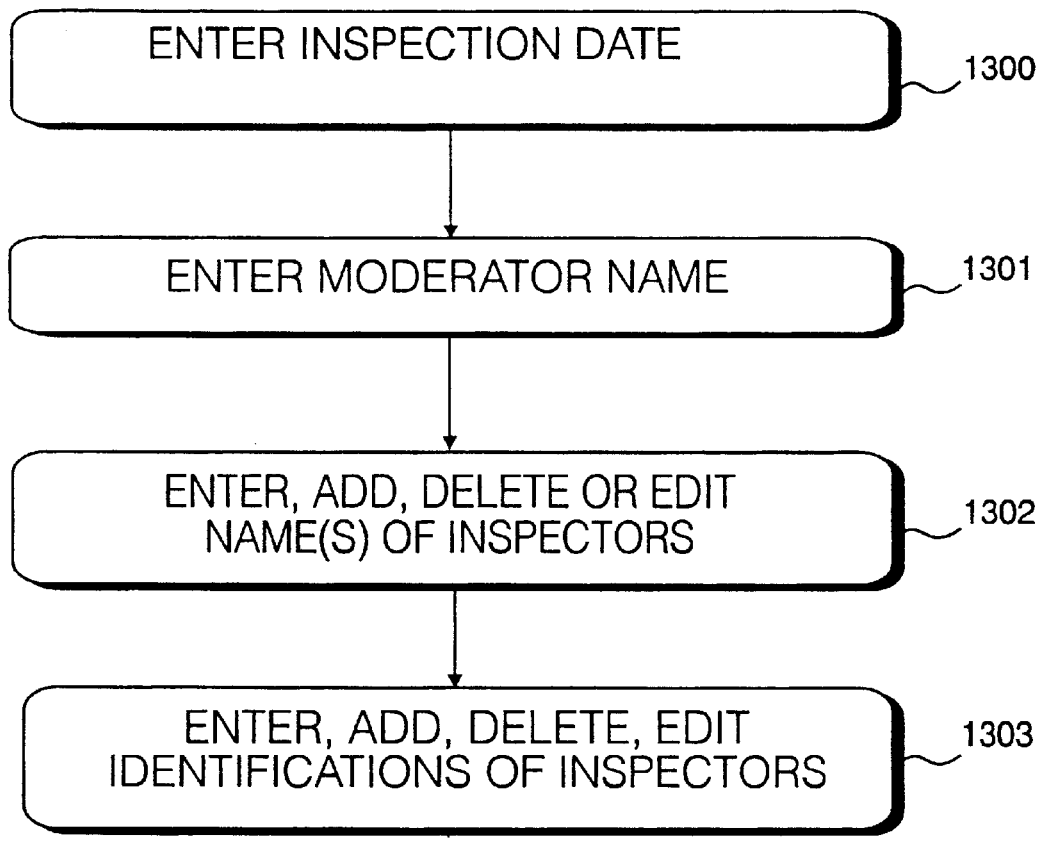
FIG. 13 illustrates data processing steps comprising a code inspection process described herein according to a third specific process of the present invention.

Referring to FIG. 13 herein, there is illustrated schematically steps carried out in a process for inputting data describing details of an inspection session. This process is entered by selecting the details item 807 of the file menu. In step 1301, the moderator enters an inspection date using the keyboard, referring visually to an appropriate dialog box display. In step 1302, referring visually to the same dialog box display, the moderator enters the moderator's own name. In step 1303, the moderator enters, adds, deletes or edits names of inspectors present in the inspection session. Each inspector has an identification code which can be entered, added, deleted or edited in step 1304 by activation of keyboard data entry in conjunction by referring visually to the visual display, and by moving an arrow or similar icon to appropriate parts of the display in known manner.

Figure 14:
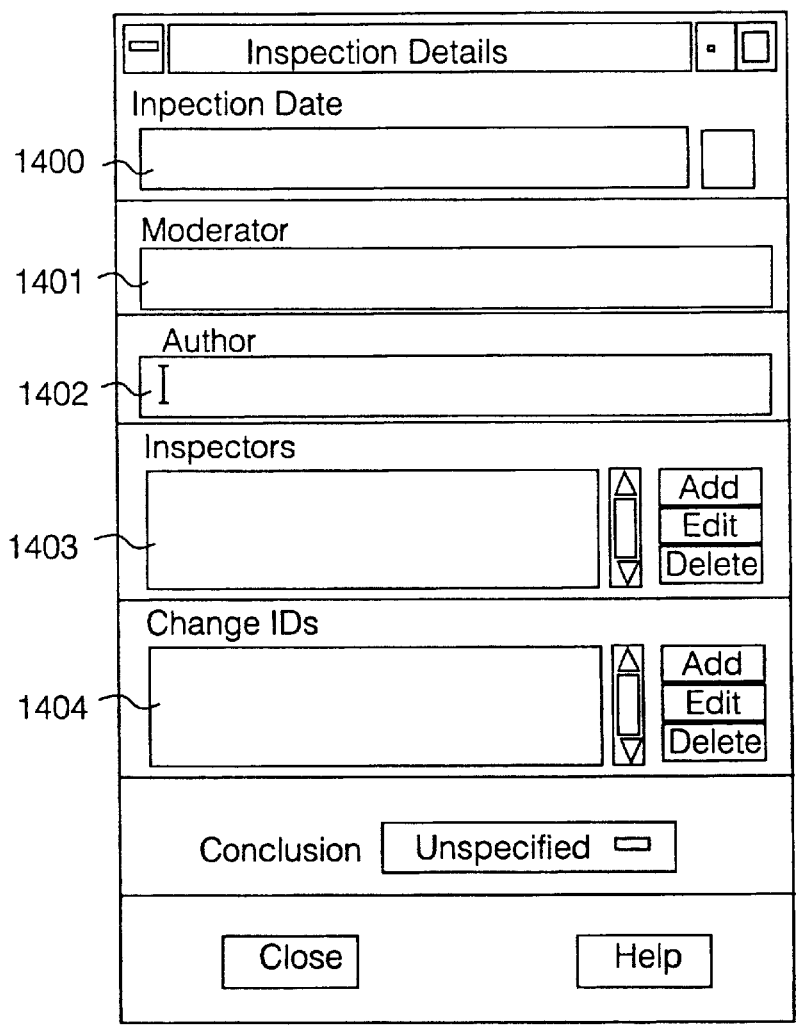
FIG. 14 illustrates schematically a visual display window operating as a data entry means for implementing process steps as illustrated with reference to FIG. 13 herein.

Referring to FIG. 14, there is illustrated schematically a dialog box window for entry and editing of inspection detail data as described with reference to FIG. 13 herein. The dialog box window comprises data entry boxes for entry of data describing inspection date 1400; moderator name 1401; author 1402; inspectors 1403; and identification numbers 1404.

Figure 15:
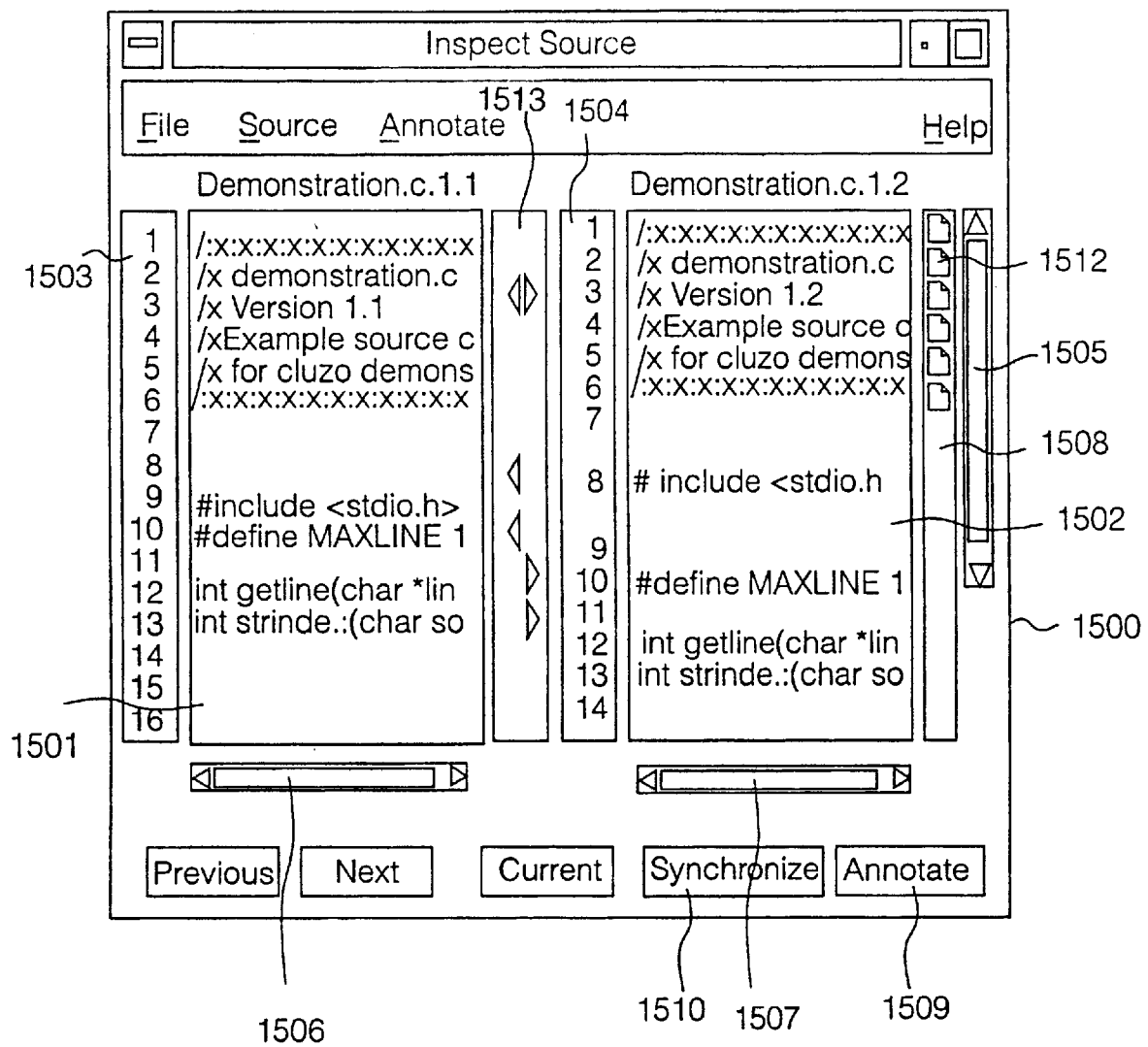
FIG. 15 illustrates schematically a display window comprising means for displaying code lines according to the specific implementation of the present invention.

Referring to FIG. 15 herein, there is illustrated an inspection source window generated by activation of the inspect item 903 from the source menu. The inspect source window display 1500 comprises first and second code display windows 1502, 1502, each code display window displaying lines of source code. First source code display window 1501 displays original source code loaded from the configuration management system. On the same screen, and viewable side by side with the first source code window, second source code window 1501 displays new source code, the new source code being an amended version of the original source code, such that the lines of original source code are directly comparable to corresponding lines of new source code. The new source code is generated as a direct replica of the original source code. However, during a code inspection session, modifications are made to the replicated source code, which result in the replicated source code becoming a new amended version of the original source code. The first source code window is provided with a first line number window 1503, and the second source code window is provided with a second line number window 1504. The first and second line number windows align with the corresponding respective first and second source code windows, such that the line numbers correspond with the respective line numbers of the original source code and the new source code, such that individual lines of original source code and new source code are presented substantially side by side for direct visual comparison by the moderator and inspectors. The original source code and new source code can be scrolled up and down together by activation of vertical scroll bar 1505. Respective first and second source code windows each have a corresponding respective horizontal scroll bar 1506, 1513 for enabling horizontal scrolling of code items within the source code windows. A current line of code under inspection is highlighted by a cursor on the display. The cursor is moved down the code by key activation of the graphical user interface by the moderator, one or a plurality of lines at a time. The cursor highlights a current line and the code lines scroll across the display.

Placed between the first and second source code windows is provided a change indicator window 1507. The change indicator window displays icons indicating changes to the original source code, and/or to the new source code, in such a manner that the individual lines of original and/or new source code which have been altered are immediately visible by the moderator and inspectors. In particular, where a line of original source code has been deleted, a left arrow icon appears on the same horizontal line as the line number of the original source code line which has been deleted. Where a new source code line has been added, a right arrow appears on the same horizontal line as the new source code line number which has been amended. Vertical spacing between lines of the original source code is adjusted such that a line of old source code is aligned with its corresponding line number in the new source code. For example, in FIG. 15 it can be seen that line 15 of the first source code window aligns on a same horizontal line of a visual display as line 15 of the new code. Spacing of the lines of the old source code and the new source code in the first and second source code windows is adjusted by incorporation of line spaces such that numbered code lines of the old source code correspond substantially in vertical alignment with corresponding respective line numbers of new source code. As the source code is scrolled vertically, the alignment of line numbers of old source code and new source code is maintained so that throughout the display of old and new source code, the moderator and inspectors view corresponding lines of old source code and new source code simultaneously on the same display. This may have an advantage of allowing an immediate visible comparison between changes to the old source code and new source code, with the moderators and inspectors attention being immediately drawn to changes in the old and new source code by the left and right arrow icons displayed in the change indicator window.

Each line in the original version of the source code is matched vertically as closely as possible to the equivalent line in the new source code and vice versa. If a line has been added in the new source code, this line is matched with the corresponding blank line in the original source code. Similarly, if a line has been removed in the new source code, a blank line is inserted to keep the lines of the original source code and the new source code matched vertically, and displayed side by side.

From the arrow icons in the change indicator display the moderator and inspections can easily view changes as follows:

A left and right arrow side by side indicates a line in the original source code file has been changed in the new source code file.

A right facing arrow indicates a line which was not in the original source code file has been added to the new source code file.

A left facing arrow indicates a line which was in the original source code file has been removed in the new source code file.

To one side of the second source code window is provided an annotation window 1508, in which annotation icons are shown against lines of the new source code, the annotation icons indicating that an annotation data exists for an adjacent line of source code. The inspect source window comprises an annotate icon 1508, activation of which allows the moderator to add an annotation to a selected portion of the source code. The annotation function in the inspect source window is available only to the moderator work station.

There will now be described an example of a code inspection session carried out in accordance with a specific example of a code inspection process according to the present invention.

Figure 16:
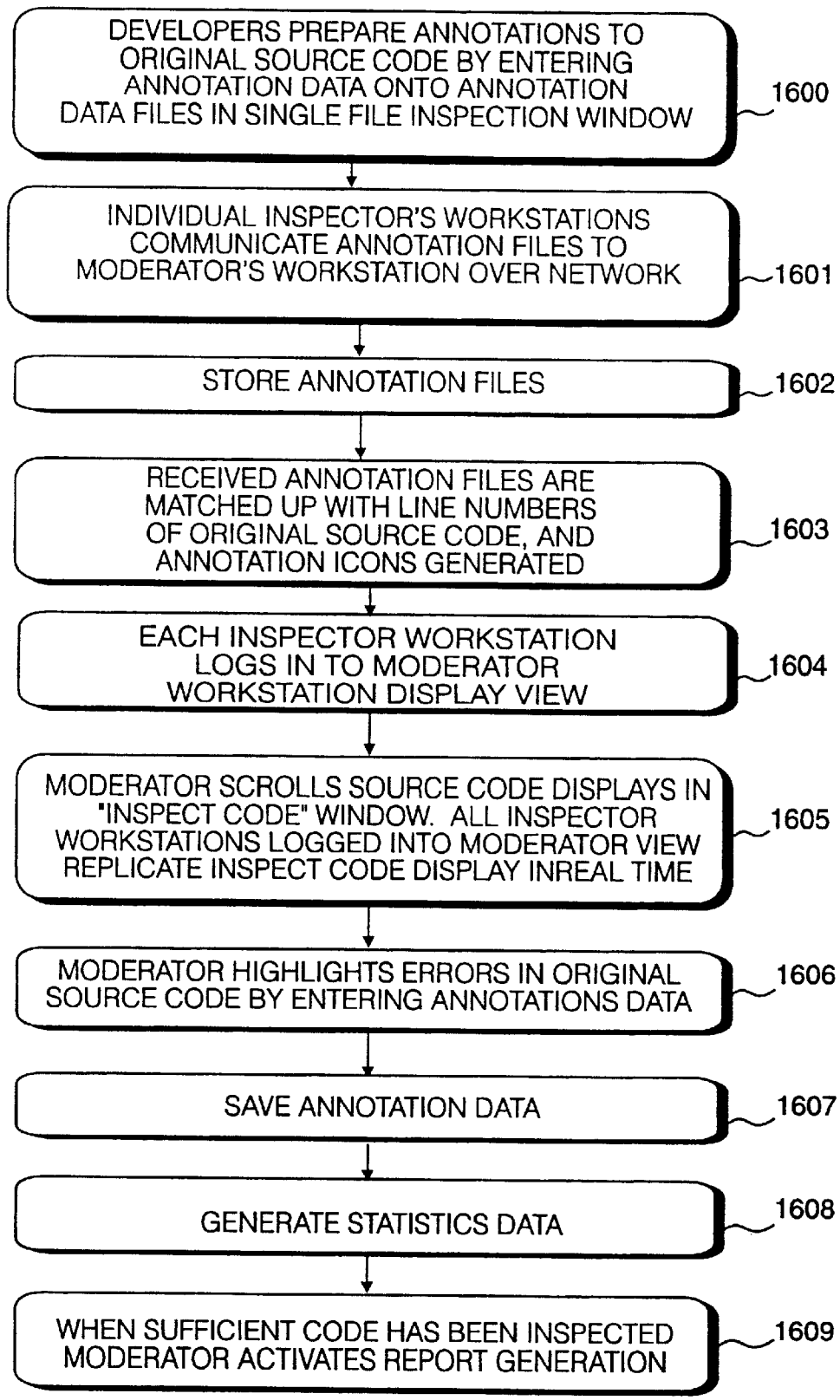
FIG. 16 illustrates schematically data processing steps carried out during a code inspection session according to a fourth specific process of the present invention.
Figure 17:
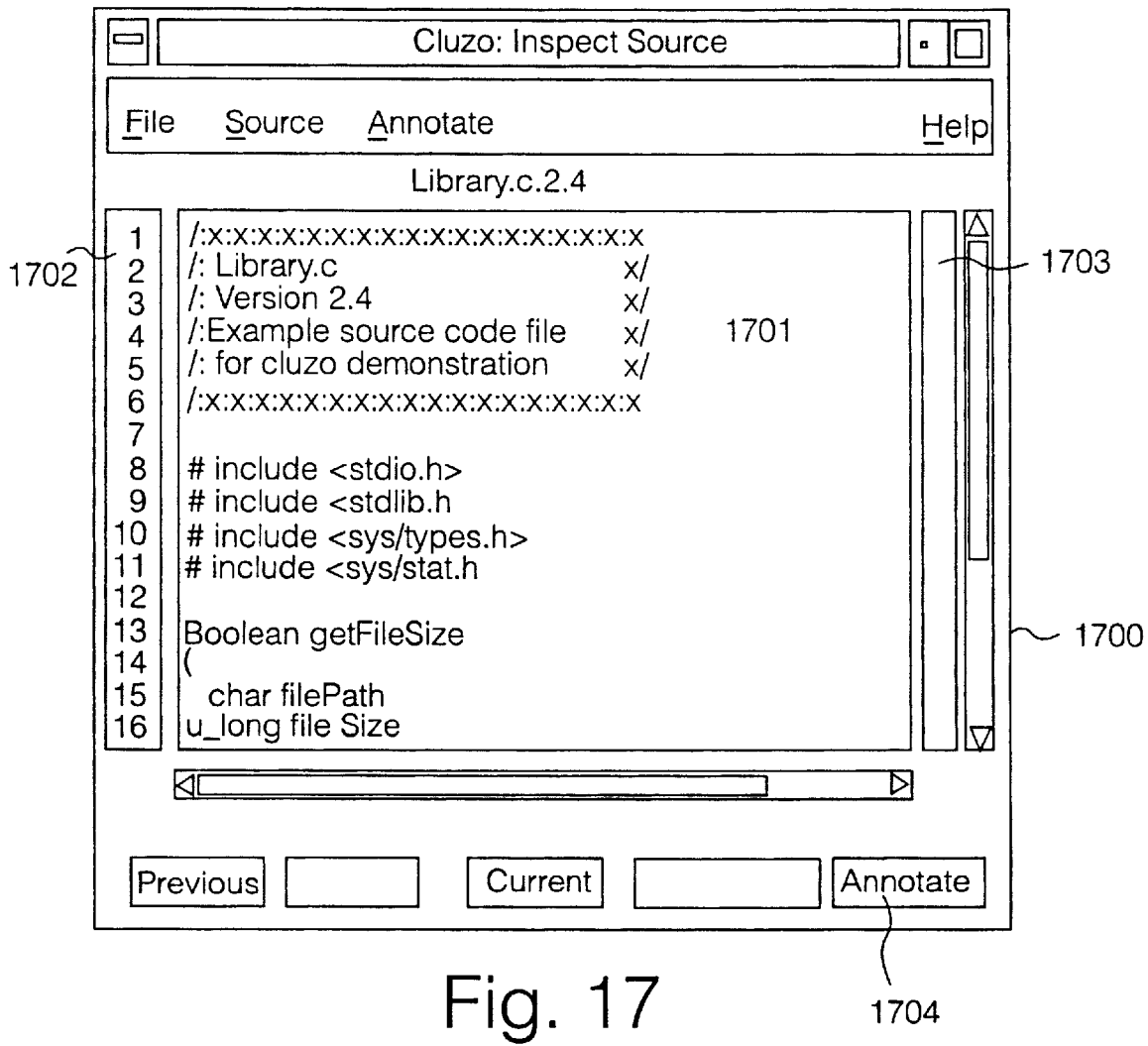
FIG. 17 illustrates a single source code display window for displaying source code on a developer workstation.
Figure 18:
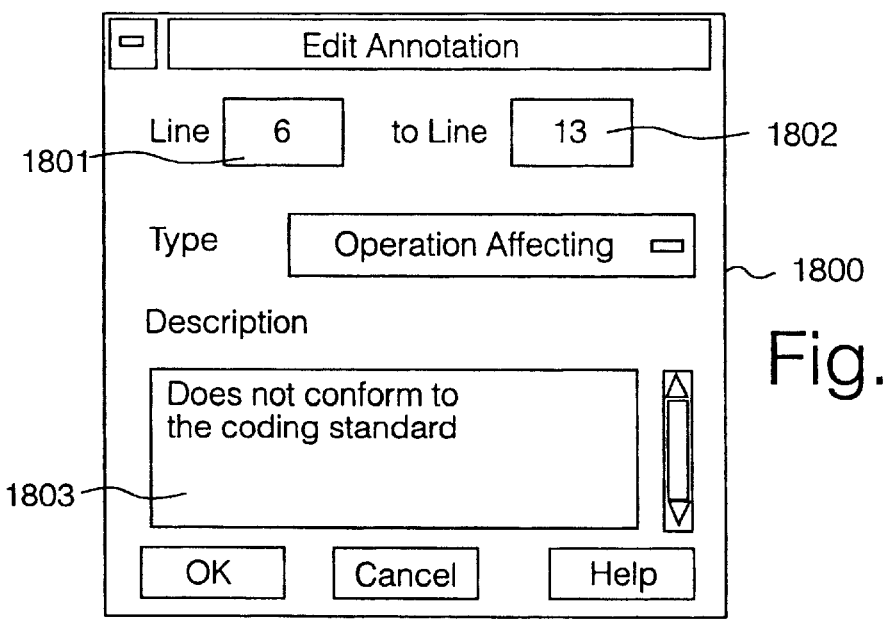
FIG. 18 illustrates an annotation editing display for entering and editing annotation data into an annotation data file.

Referring to FIG. 16 herein, there is illustrated in more detail steps 603, 604 of the code inspection process, including annotations to source code, and generation of data concerning a code inspection session. Prior to a code inspection session, developers may prepare annotations to original source code on which they are working, by entering annotation data into annotation data files in a single file inspection window display generated by code inspection application 405. An example of a single file inspection window display is illustrated in FIG. 17 herein. The display comprises a window box display 1700 having a main window 1701 in which lines of source code are displayed; an adjacent line number display window 1702 for display of line numbers adjacent the lines of code; and an annotation window 1703 in which icons are displayed for lines of code for which annotation data has been entered by a developer. A developer may add or delete annotation data by activation of an annotate item 1704, activation of which results in generation of an edit annotation dialog box through which the developer can enter annotation data to a separate file, which is stored by the code inspection application in code storage component 504. Each developer may prepare a plurality of annotations for the particular sections of source code on which they are working 1600. Annotation files prepared by each of the individual developers at their respective workstations are communicated 1601 from the developers' workstations to the moderators workstations over the network. All received annotation files are stored, 1602 and are accessible by code inspection application 405. The received annotation files are logically matched up with the line numbers of the original source code, and annotation icons are generated in annotation window 1508 adjacent the line to which the respective annotation line belongs. As the moderator scrolls the original source code file and new source code files in tandem, the line numbers and annotations in the line number windows 1503, 1504 and annotations window 1508 scroll with the source code, maintaining their side by side relationship as the source code files are scrolled up and down. Since each inspector workstation is logged in to the moderator workstation display view, during the code inspection session all developers have a same view as the moderator in real time 1604, 1605 on the visual displays of their respective graphical user interfaces. The moderator controls the code inspection session by controlling his or her display in the inspect source window displayed on the moderator's workstation. The moderator and developers discuss verbally any annotations, problems or proposed alterations to the code over the voice communication means, eg internet phone or voice conference facility. As a result of discussions between the developers and the moderator, annotations to the new source code can be made by the moderator activating the annotate item 1509 in the inspect source window 1500. Activation of this item generates an edit annotation window which overlays the inspect source window, as illustrated in FIG. 18 herein. Edit annotation window 1800 comprises first and second data entry windows 1801, 1802 for entering line numbers to which the annotation relates, together with a text window 1803 for entry of annotation text describing the problem or comment relating to the identified lines of code.

The moderator controls the speed of code inspection by the rate at which he scrolls the displayed code lines across the inspect source window whilst the individual developers are logged into the display view of the moderators workstation. At any time the moderator can release control of the inspect source window to one of the developers by passing control of the cursor to a specified developer's workstation. At any time, an individual developer can look ahead at the source code locally on his or her workstation by activating synchronized item 1510 in the inspect source window displayed on the developers workstation. Activation of the synchronized item de-couples the developers view in the inspect source window, giving him local control of vertical scroll bar 1511 to scroll the source code up and down to look ahead in prepartion for items of source code for which he is responsible, or to look back to review source code having been recently inspected.

Figure 19:
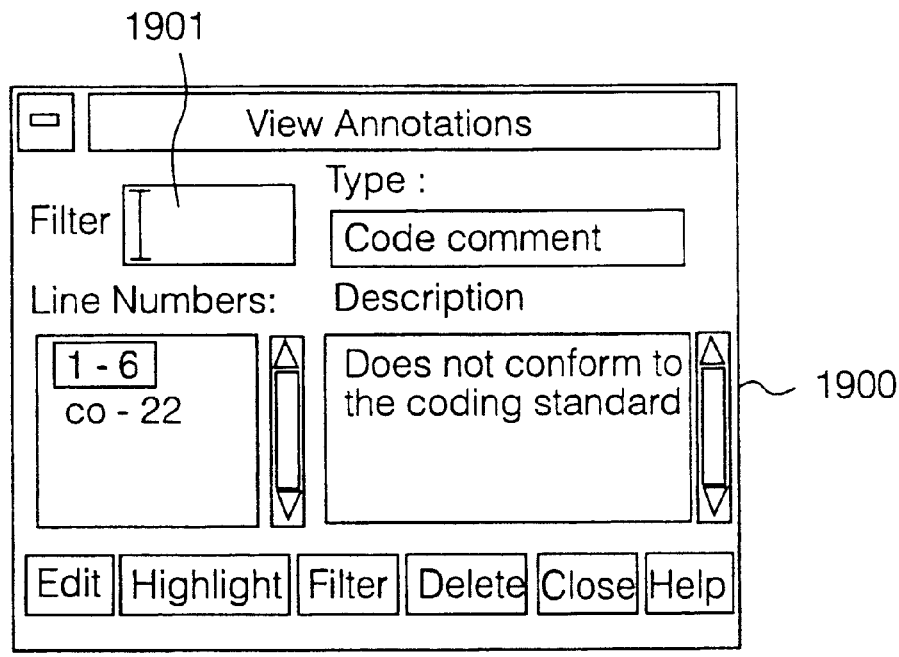
FIG. 19 illustrates schematically a window display for viewing annotation data stored in an annotation data file.

Annotations may be viewed by selecting an annotate view item from an annotate menu icon 1511 in the inspect source window 1500. Activation of this item leads to generation of a view annotations display as illustrated in FIG. 19 herein. The annotation data may be edited using the view annotation window display. Further, annotation data may be filtered by entering in filter field 1901 a line number of the source code line to be filtered. Alternatively, by moving the cursor of a pointing device to an annotation icon 1512 and activating that annotation icon, the annotations for the corresponding number of source code may be filtered for viewing.

In the current best mode, annotation data may be of three types, examples of which are as follows: The annotation data may comprise a code comment, being a comment on a corresponding line of code identified by the code line number. Secondly, the annotation may indicate that a change or error in the code does not affect operation of the functionality of the code to a significant degree (ie non-operation affecting error). Thirdly, the annotation may indicate that an error in a line of source code does significantly affect the operation of a portion of source code as a whole (an operation affecting annotation). During the code inspection process, the developers are especially interested in lines of code containing errors which affect the operation of the source code as a whole. By identifying source code lines having errors which identify operations of the source code as a whole, using the specific processes described herein a significant advantage may be obtained compared to prior art source code development techniques. If a line of source code containing an operation affecting error can be identified during a code inspection process, well before the source code is implemented in products and shipped to customers, the maintenance requirement and back up requirement for altering code already sent out to customers may be drastically reduced, and the overall reliability and performance of code may be improved.

Errors may be further classified as follows:

Possible Bugs:

Variables which may be unset when used (often initialized in a statement).

Ignoring return values from functions.

Control statements containing assignments (these can have embedded side effects, since not all parts of the control statement are guaranteed to execute.

Passing a function an argument of a type different to that in its definition.

Hanging "case" or "if" statements.

Implicit value conversion.

Ambiguous Statements:

Unused variables or arguments to functions.

Suggesting points where extra parentheses may improve clarity.

Bad Practices:

Declaring the same identifier both globally and locally.

Not using braces in control statements.

Inconsistent indentation.

Use of "magic" (ie literal) numbers, rather than const or enum.

Long functions (more than 50 lines as defined in coding standards).

Unreachable or redundant code (eg explicit casts).

Annotation data is entered by the moderator, 1606, and all annotation data is saved, 1607.

In a further development of the code inspection tool, a further interface may be provided, equivalent to the interface to the configuration management system 505, or an adaptation of that interface, for interfacing to a trends analysis database, for example the known AquaProva® database which provides C++ expert advice and error detection. The AquaProva® database, where accessed from the code development tool, may automatically provide automatic error detection. Another such trends analysis databases usable for automatic error detection via an interface to the code inspection tool includes the ProLint database which allows C and C++ source code to be checked for of the order of 600 types of different errors. Types of error detected may be intermodule inconsistencies, uninitialized variables, unusual expressions, order of evaluation errors, non-virtual base class destructors, hidden names, improperly formed or missed assignment operators and copy constructors. Further, the ProLint error detection tool may operate to find potential problems with pointers and errors which may make code unportable, for example assuming all variables are automatically initialized to zero, and also checks for non-portable syntax and quirky C/C++ code. Modifications of the best mode described herein include interfacing the code inspection tool with such known automatic error detection tools. By interfacing the code inspection tool to a trends analysis database, the developers may track defects on a particular project to see if any trends of errors emerge.

Figure 21:
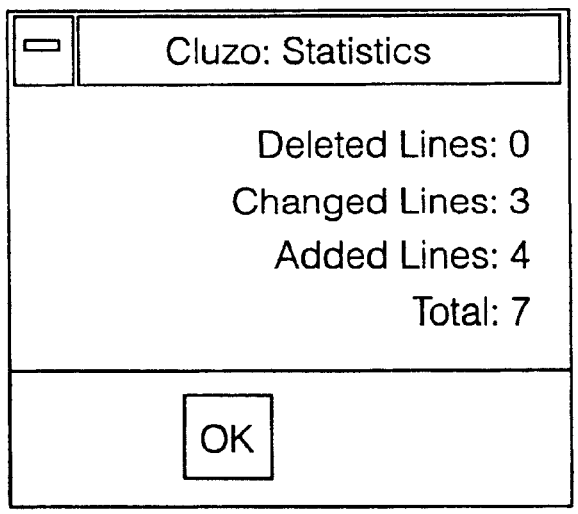
FIG. 21 illustrates a statistics display available to a moderator and/or developers at their respective graphical user interfaces.

Data describing statistics concerning the code inspection process are generated 1608. Statistics can be displayed to the moderator during the code inspection session by activation of a statistics display window, an example of which is illustrated in FIG. 21 herein. When sufficient code has been inspected and the moderator terminates the code inspection session, report generation is automatically activated based upon the statistics data which has been automatically generated.

Figure 20:
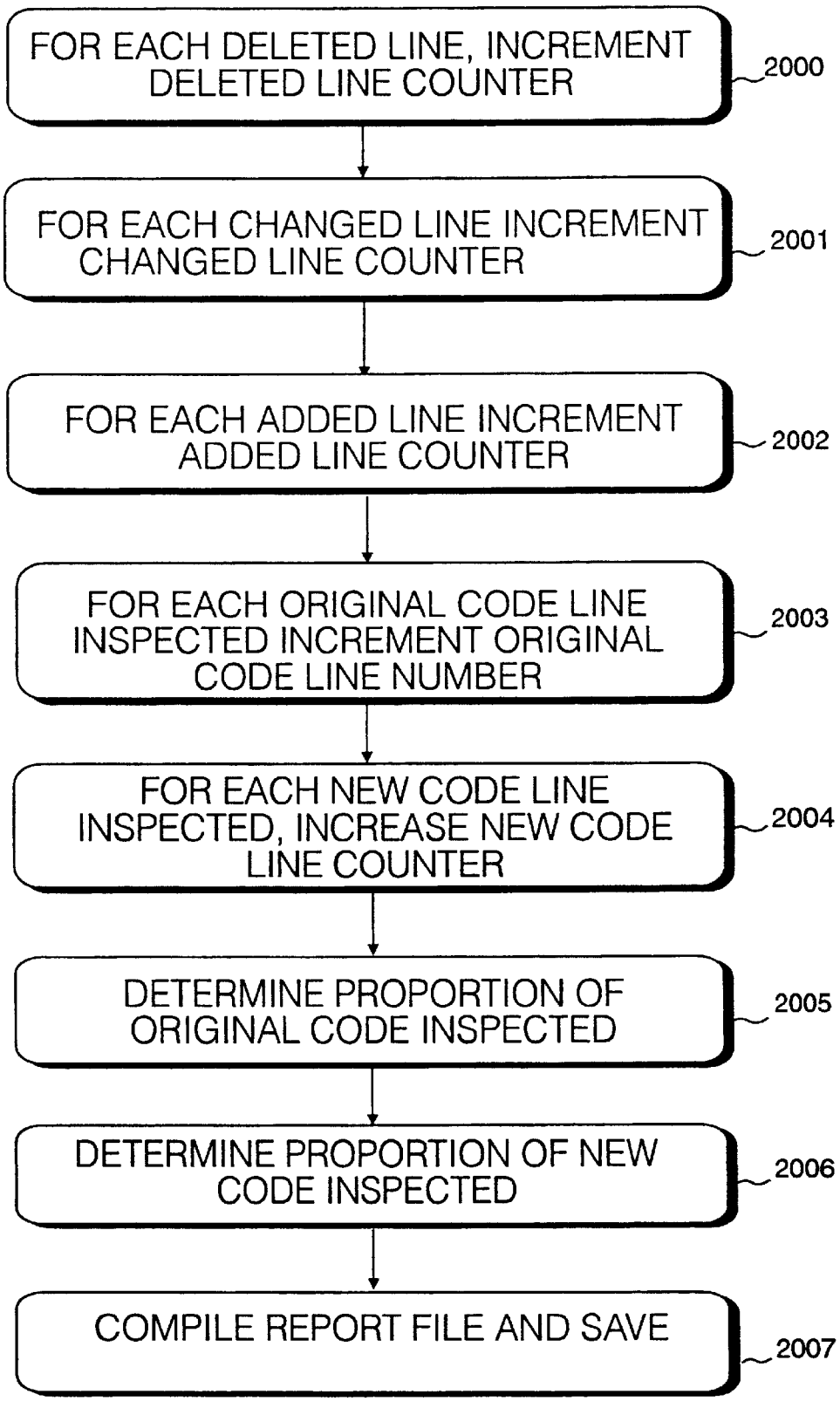
FIG. 20 illustrates steps comprising a process for compilation of a report file storing data describing a code inspection session.

Report data is generating as follows: referring to FIG. 20 herein, during the code inspection process, for each deleted line, a deleted line counter is incremented, 2000. For each line changed during the code inspection process a changed line counter is incremented 2001. For each line added to the new source code, an added line counter is incremented 2002. For each original code line inspected, an original code line counter is incremented 2003, and similarly, for each new code line inspected a new code line counter is incremented 2004. The old and new line code line counters are incremented in response to a signal generated from movement of the cursor down the code lines. From the original code line counter and new code line counter there is determined 2005 a proportion of original code inspection, and a proportion of new code inspected 2006. A report file in the form of a text file is compiled, comprising data describing the deleted line count, changed line count, added line count, original line count, new code line count, proportion of original and new code inspected, along with the previously entered data describing the inspection date, the duration of the inspection, input from the timer component, the name of the moderator, the names of the inspectors, and the inspectors identifications. The above parameters comprising inspection report data are printed to an inspection report file. The report file may be printed or displayed using either a plain text format or an HTML format. An example of a report data file format is illustrated in FIG. 22.

An example of plain text file is shown in FIGS. 23A and 23B herein, and an example of an HTML format file is shown in FIG. 24 herein.

By producing a code inspection report, the overall code inspection process can be monitored, and in particular the efficiency of the code inspection process. Having such information available allows development managers to assess allocation of resources to new products, since it may enable them to gain knowledge of an amount of time spent by developers in code inspection to develop a new program.

Further, the automated code inspection process described herein may have an advantage of improving productivity of developers in absolute terms. By providing an interactive graphical user interface and providing automated networking of workstations and automated passage of annotation files, together with a conference voice facility, the efficiency, speed and productivity of a code inspection process may be increased compared to known methods. Since reports are generated automatically, the efficiency of parts of a code inspection process which occur after the code inspection session is improved.

The source code is returned to the configuration management system. Changes to the source code are not actually made during the code inspection process, but are made by the developers in their own time after the code inspection session, to allow the developers sufficient time to reflect upon the proposed changes to code, and to fully consider the implications of the annotations made during the code inspection process.

What is claimed is:

1. A machine executable code inspection process for inspecting a quantity of pre-written code simultaneously by a plurality of users each provided with a corresponding respective graphical user interface, the inspection process comprising the steps of:

in putting said pre-written code from an external source, and storing said code in a memory area; displaying simultaneously said code on at least two visual display devices corresponding to said graphic user interface;

in response to inputs from said corresponding respective graphical user interface, modifying individual lines of said code; and for each modified line of code; simultaneously displaying on said visual display devices said pre-written code and modified code and at least one respective icon identifying said line of code.

2. The process as claimed in claim 1 comprising the steps of:

replicating said code and storing said replicated code in a second memory area;

displaying said pre-written code and said replicated code on a same screen display of said visual display devices.

3. The process as claimed in claim 1, comprising the steps of:

counting a number of said modified code lines;

producing data describing a number of said modified code lines.

4. The process as claimed in claim 1, comprising the steps of:

inputting a start session signal;

activating a timer in response to said start session signal;

stopping said timer in response to a stop session signal;

generating a session time signal corresponding to a time difference between said start session signal and said stop session signal.

5. The process as claimed in claim 1, comprising the step of:

generating data describing a rate of inspection of said code.

6. The process as claimed in claim 1, comprising the steps of:

generating a report output data describing a result of a code inspection.

7. A machine executable process for recording details of a code inspection session by a plurality of users, said process comprising the steps of:

inputting code comprising a plurality of codes lines;

displaying simultaneously said plurality of code lines on at least two visual display devices corresponding to said plurality of users;

inputting modifications to said code to produce modified codes;

displaying said modified code with said code simultaneously on said visual display devices; and generating a data describing said modified code.

8. The process as claimed in claim 7, wherein said step of generating data describing said modified code comprises generating a metrics data describing at least one metric of said modified code.

9. The process as claimed in claim 7, further comprising the steps of:

inputting annotation data describing annotations to said code lines;

storing said annotation data to a memory device; and displaying said annotation data on said visual display devices.

10. The process as claimed in claim 7, wherein said step of generating data describing said modified code comprises generating data describing an amount of annotations of said modified code.

11. The process as claimed in claim 7, wherein said step of generating data describing said modified code comprises generating data describing an amount of code lines modified during said code inspection session.

12. The method as claimed in claim 7, further comprising the step of recording a time taken to modify said code.

13. A code inspection tool for facilitating inspection of code comprising a plurality of code lines, said tool being executable by a machine comprising at least one data processing means, at least one data storage means, and a plurality of graphical user interfaces having visual display devices, said tool comprising:

an interface means for interfacing with a code development tool for input and output of said code;

a display generation means for generating a plurality of displays of said code for simultaneous display on at least two of said visual display devices;

means for inputting modifications to said code to produce modified code;

means for displaying said modified code with said code simultaneously on said visual display devices;

a monitoring means for monitoring a result of a code inspection process; and a report data generation means for generating a report describing a code inspection session.

14. The code inspection tool as claimed in claim 13, wherein said display generation means is operable to generate a window display arranged for display of said code lines.

15. The code inspection tool as claimed in claim 13, wherein a said display comprises a window for containing a display of line numbering of code lines.

16. The code inspection tool as claimed in claim 13, wherein a said display comprises an icon representing an inserted code line.

17. A code inspection process for inspecting a quantity of original source code by a plurality of users each provided with a corresponding respective graphical user interface, said inspection process comprising the steps of.

at a plurality of said graphical user interfaces, simultaneously generating a display of original source code;

at individual ones of said graphical user interfaces, entering annotation data describing annotations to said source code, each said annotation indentifying a line number of said source code;

sending said annotation data to a data storage device and storing said annotation data;

generating simultaneously a source code display on each of said graphical user interfaces, said source code display comprising a first display area for display of original source code, and a second display area for display of replicated source code;

at each graphical user interface, scrolling said corresponding respective source code display such that all said source code displays are scrolled simultaneously and show a same common view;

interrupting said scrolling process for entry of annotation data relating to source code displayed during said scrolling process;

storing said annotation data entered during said interruptions; and terminating said scrolling process.

18. The process as claimed in claim 17, further comprising the step of:

for each line of code scrolled, incrementing a line counter recording data describing a quantity of said scrolled lines; and storing said scroll count data to a report file.

19. The process a s claimed in claim 17, further comprising the step of:

for each said annotation data entered, incrementing a counter describing a count of said annotations; and storing said annotation count data to a report file.

20. The process as claimed in claim 17, comprising the step of: generating a report file containing data describing:

data identifying a plurality of human operators;

data describing a plurality of source code files;

data describing an amount of new code lines in each of said source code files;

data describing a proportion of original source code lines and new source code lines changed;

data describing a number of annotation comments.

21. The process as claimed in claim 20, wherein said data further comprises:

data describing a type of annotation data; and an amount of annotations of each of said types.

22. The process as claimed in claim 17, comprising the step of:

identifying source code lines having errors which affect overall operation of said source code; and storing annotation data describing said operation affecting errors.

23. The process as claimed in claim 17, further comprising the step of: timing said code inspection session.

* * * * *